(12) United States Patent
Seo et al.

(10) Patent No.: US 12,468,349 B2
(45) Date of Patent: Nov. 11, 2025

(54) COVER WINDOW AND DISPLAY DEVICE INCLUDING THE SAME

(71) Applicant: Samsung Display Co., LTD., Yongin-si (KR)

(72) Inventors: Hyunseung Seo, Suwon-si (KR); Jin Su Nam, Hwaseong-si (KR); Jun Ho Lee, Suwon-si (KR); Seungho Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 205 days.

(21) Appl. No.: 18/205,768

(22) Filed: Jun. 5, 2023

(65) Prior Publication Data

US 2023/0418336 A1    Dec. 28, 2023

(30) Foreign Application Priority Data

Jun. 24, 2022    (KR) .................. 10-2022-0077281

(51) Int. Cl.
*B32B 3/02* (2006.01)
*G06F 1/16* (2006.01)

(52) U.S. Cl.
CPC .............. *G06F 1/1656* (2013.01); *B32B 3/02* (2013.01)

(58) Field of Classification Search
CPC ....... B32B 3/02; B32B 7/12; B32B 2307/412; B32B 2457/20; B32B 2457/208; H05K 5/03; G06F 1/1656
See application file for complete search history.

(56) References Cited

U.S. PATENT DOCUMENTS

2016/0016845 A1 *   1/2016   Cho ..................... G06F 1/181
                                                 216/41

FOREIGN PATENT DOCUMENTS

| CN | 112785926    | * | 5/2021 |
|----|--------------|---|--------|
| JP | 2017078861 A |   | 4/2017 |
| KR | 101236374 B1 |   | 2/2013 |
| KR | 1020130041275 A | | 4/2013 |

* cited by examiner

*Primary Examiner* — Elizabeth E Mulvaney
(74) *Attorney, Agent, or Firm* — CANTOR COLBURN LLP

(57) ABSTRACT

A cover window includes a base layer including a light-emitting area and an outer area surrounding at least a portion of the light-emitting area and a functional layer disposed on at least one surface of the base layer and having a refractive index increasing from the light-emitting area to outer area.

17 Claims, 31 Drawing Sheets

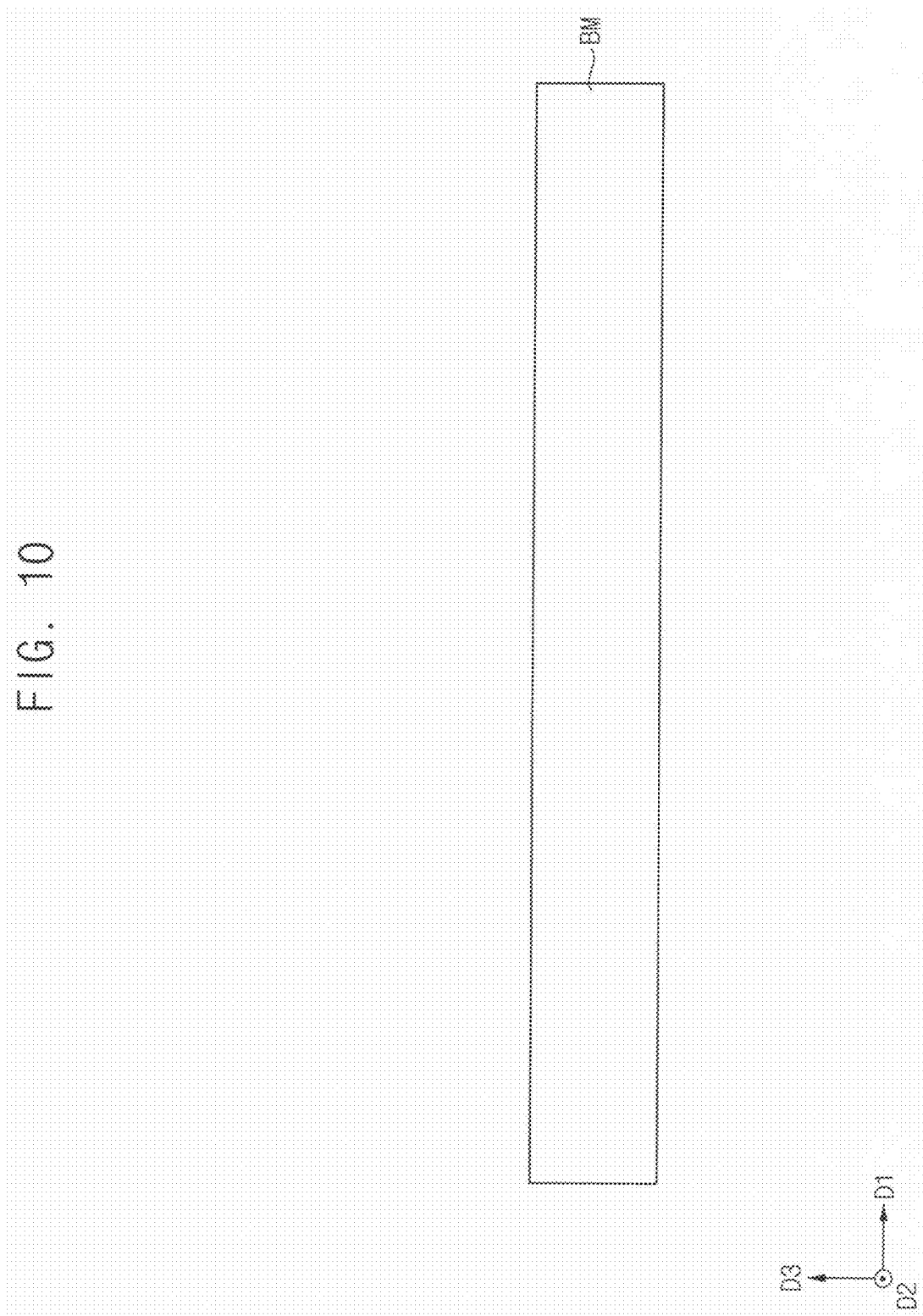

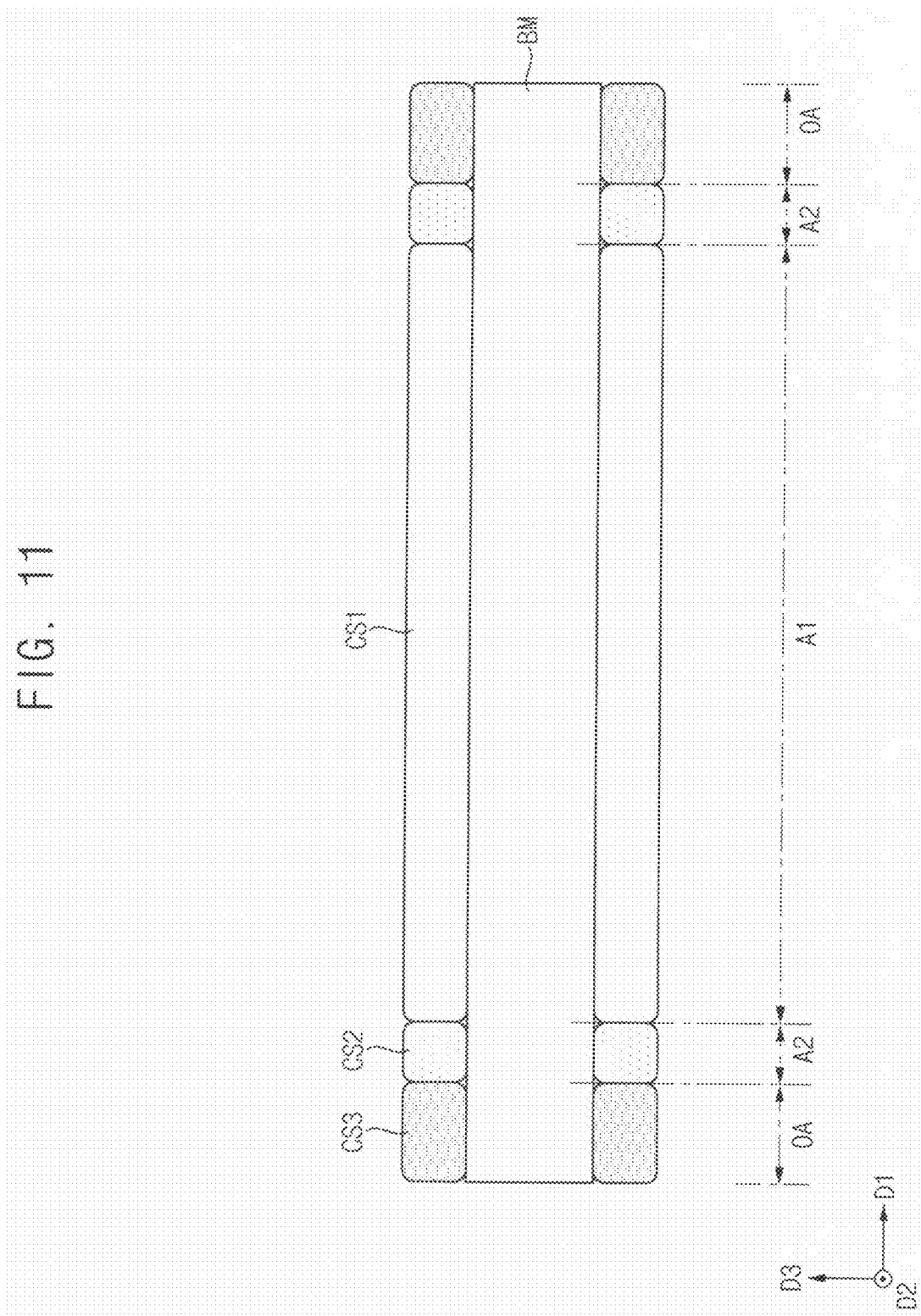

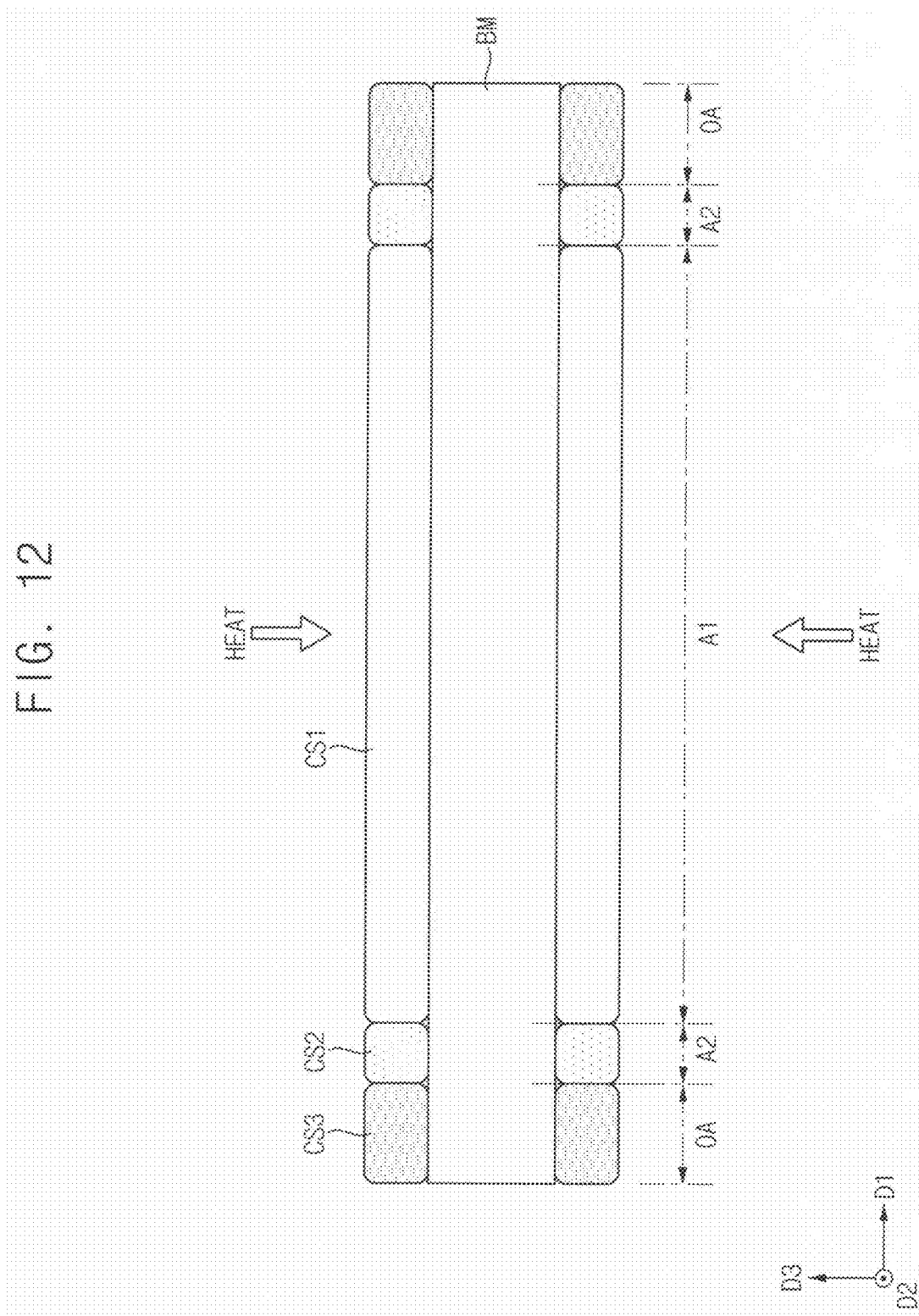

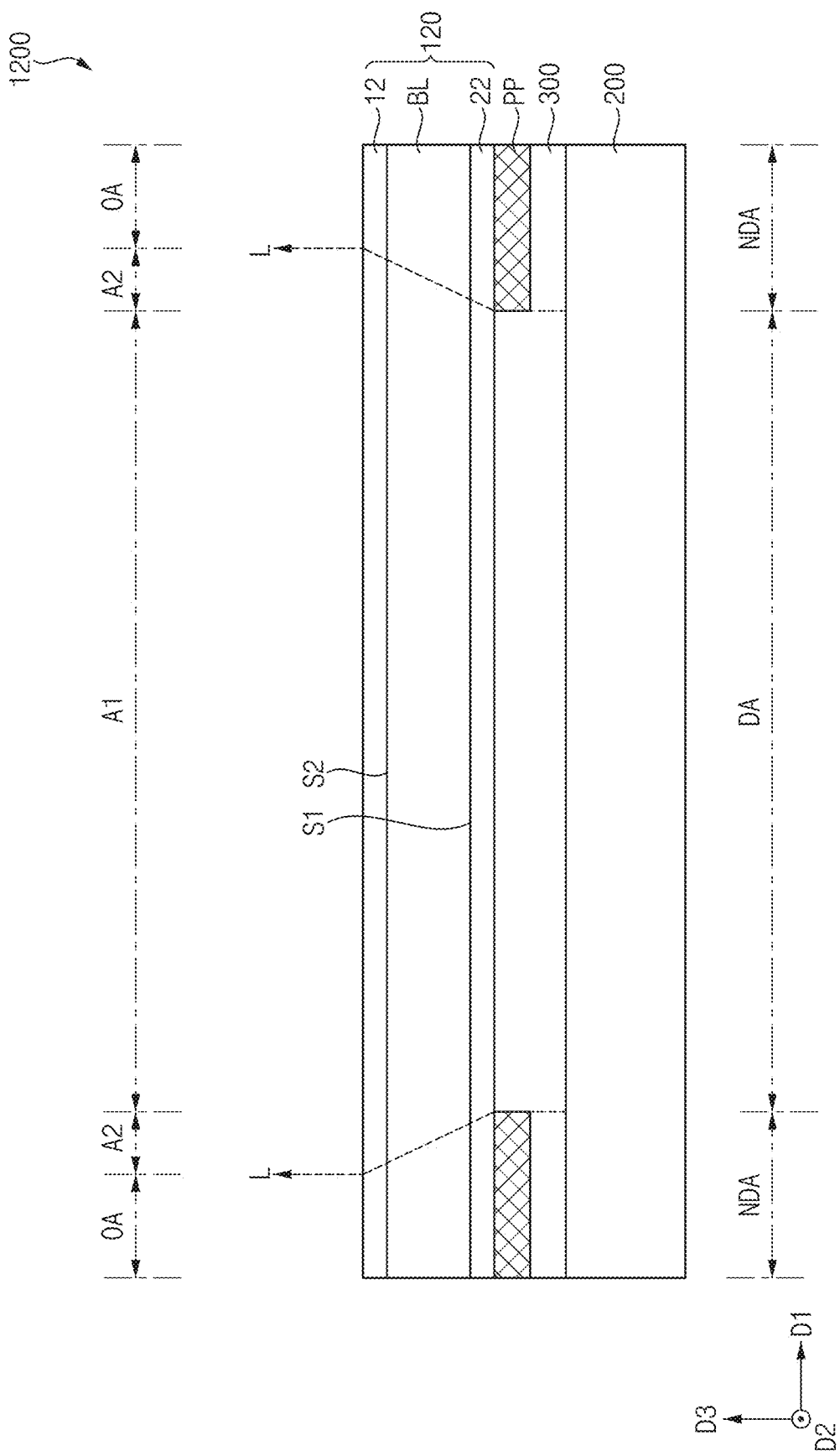

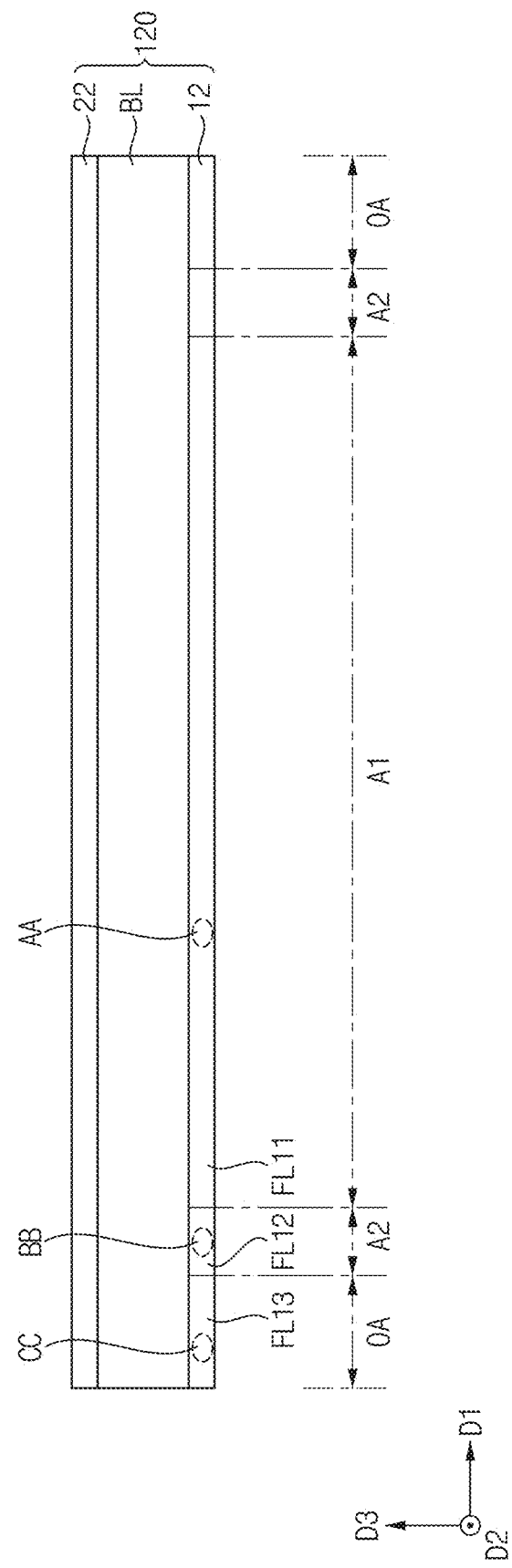

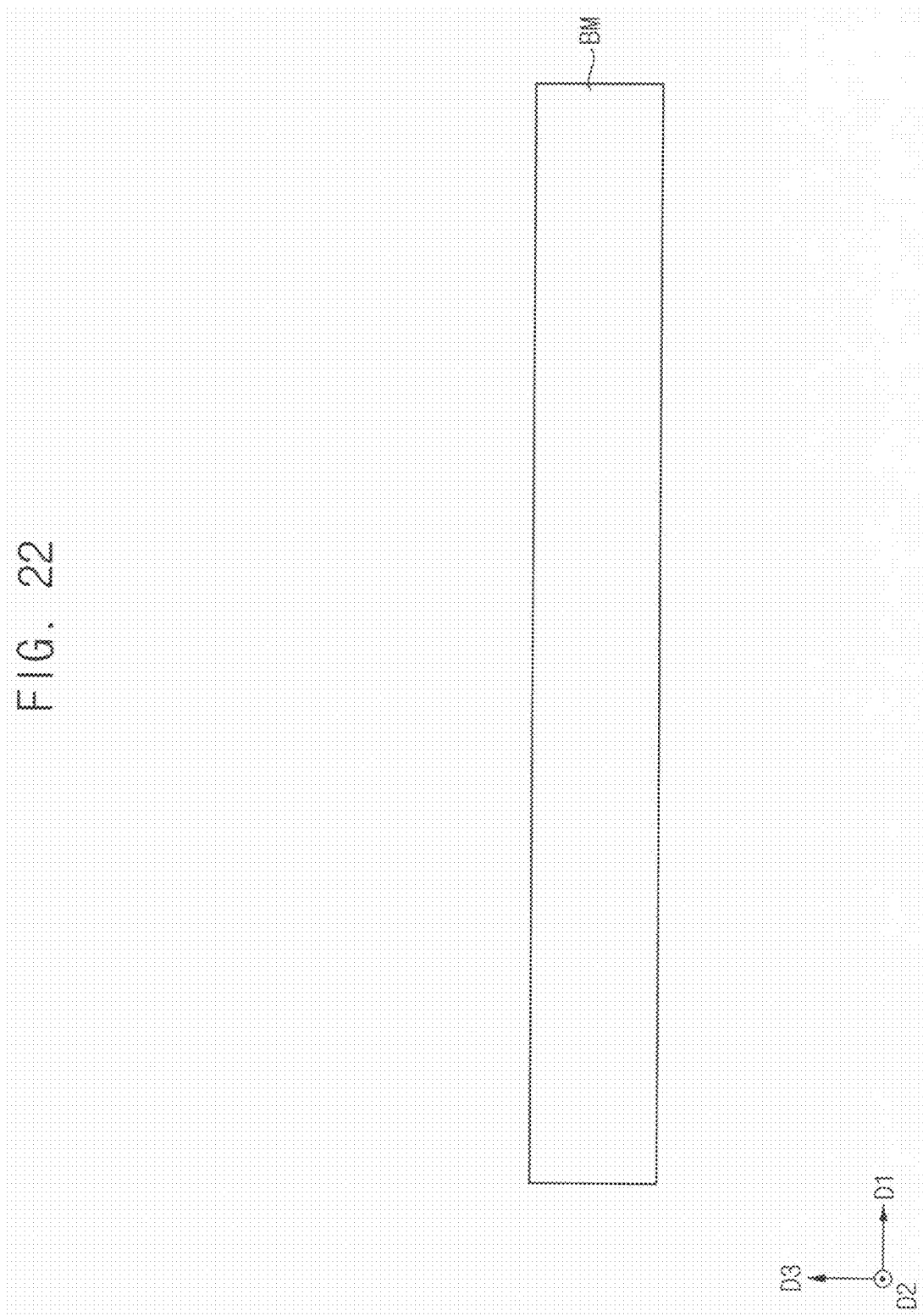

COVER WINDOW AND DISPLAY DEVICE INCLUDING THE SAME

This application claims priority to Korean Patent Application No. 10-2022-0077281, filed on Jun. 24, 2022, and all the benefits accruing therefrom under 35 U.S.C. § 119, the content of which in its entirety is herein incorporated by reference.

BACKGROUND

1. Field

Embodiments provide generally to a cover window and a display device including the cover window.

2. Description of the Related Art

A display device includes a display panel and a cover window. The cover window is disposed on the display panel and has strength to protect the display panel. The display panel includes a pixel and lines for driving the pixel. In order to prevent the lines from being recognized by a user, a printed pattern may be further disposed under the cover window. An area in which an image is not visually recognized by the user by the printing pattern is defined as a bezel of the display device.

SUMMARY

Embodiments provide a cover window.

Embodiments provide a display device including the cover window.

A cover window in an embodiment of the disclosure includes a base layer including a light-emitting area and an outer area surrounding at least a portion of the light-emitting area and a functional layer disposed on at least one surface of the base layer and having a refractive index increasing from the light-emitting area to the outer area.

In an embodiment, the light-emitting area may include a first area and a second area surrounding at least a portion of the first area, a third refractive index of the functional layer overlapping the outer area may be greater than a first refractive index of the functional layer overlapping the first area, and the third refractive index may be greater than a second refractive index of the functional layer overlapping the second area.

In an embodiment, the second refractive index may be greater than the first refractive index.

In an embodiment, the functional layer overlapping the first area may include a first ion, the functional layer overlapping the second area may include a second ion, the functional layer overlapping the outer area may include a third ion, a third ionic radius of the third ion may be greater than a first ionic radius of the first ion, and the third ionic radius may be greater than a second ionic radius of the second ion.

In an embodiment, the second ionic radius may be greater than the first ionic radius.

In an embodiment, a third content of the third ion may be greater than a first content of the first ion, and the third content may be greater than a second content of the second ion.

In an embodiment, the second content may be greater than the first content.

In an embodiment, the functional layer overlapping the first area may include an ion by a first content, the functional layer overlapping the second area may include the ion by a second content, the functional layer overlapping a third area may include the ion by a third content, the third content may be greater than the first content, and the third content may be greater than the second content.

In an embodiment, the second content may be greater than the first content.

In an embodiment, the functional layer may include a first functional layer disposed on a first surface of the base layer and a second functional layer disposed on a second surface opposite to the first surface of the base layer.

A display device in an embodiment of the disclosure includes a display panel, a base layer disposed on the display panel and including a light-emitting area and an outer area surrounding at least a portion of the light-emitting area, and a functional layer disposed on at least one surface of the base layer and having a refractive index increasing from the light-emitting area to the outer area.

In an embodiment, the light-emitting area may include a first area and a second area surrounding at least a portion of the first area, and the display panel may include a display area corresponding to the first area and a non-display area corresponding to the outer area.

In an embodiment, a light emitted from the display area may be refracted in the functional layer and emitted to the second area.

In an embodiment, a third refractive index of the functional layer overlapping the outer area may be greater than a first refractive index of the functional layer overlapping the first area, and the third refractive index may be greater than a second refractive index of the functional layer overlapping the second area.

In an embodiment, the second refractive index may be greater than the first refractive index.

In an embodiment, the functional layer overlapping the first area may include a first ion, the functional layer overlapping the second area may include a second ion, the functional layer overlapping the outer area may include a third ion, a third ionic radius of the third ion may be greater than a first ionic radius of the first ion, and the third ionic radius may be greater than a second ionic radius of the second ion.

In an embodiment, a third content of the third ion may be greater than a first content of the first ion, and the third content may be greater than a second content of the second ion.

In an embodiment, the functional layer overlapping the first area may include an ion by a first content, the functional layer overlapping the second area may include the ion by a second content, the functional layer overlapping a third area may include the ion by a third content, the third content may be greater than the first content, and the third content may be greater than the second content.

In an embodiment, the display device may further include a print pattern disposed under the base layer. A width of the outer area may be smaller than a width of the print pattern.

A display device in embodiments may include a display panel and a cover window disposed on the display panel, and a functional layer may be formed on at least one surface of the cover window. The refractive index of the functional layer may increase from a central area of the display device toward an outer area. Accordingly, light emitted from the display panel may be refracted by the functional layer. Accordingly, the light may be emitted toward the outer area, and the bezel of the display device may be reduced.

In addition, the functional layer may be formed through an ion exchange process. As the ion radius of the ions included in the functional layer increases and the content of the ions increases, the refractive index of the functional layer may increase, and the strength of the functional layer may increase.

BRIEF DESCRIPTION OF THE DRAWINGS

Illustrative, non-limiting embodiments will be more clearly understood from the following detailed description in conjunction with the accompanying drawings.

FIGS. 10, 11, 12, and 13A are cross-sectional views illustrating a method of manufacturing the cover window of FIG. 9A, and FIGS. 13B to 13D are enlarged views of portions AA, BB and CC, respectively, of a first functional layer of the cover window of FIG. 13A.

FIG. 14 is a cross-sectional view illustrating an embodiment of a display device.

FIGS. 22, 23, 24, and 25A are cross-sectional views for explaining a method of manufacturing the cover window of FIG. 21A, and FIGS. 25B to 25D are enlarged views of portions AA, BB and CC, respectively, of a first functional layer of the cover window of FIG. 25A.

DETAILED DESCRIPTION

Figure 1:
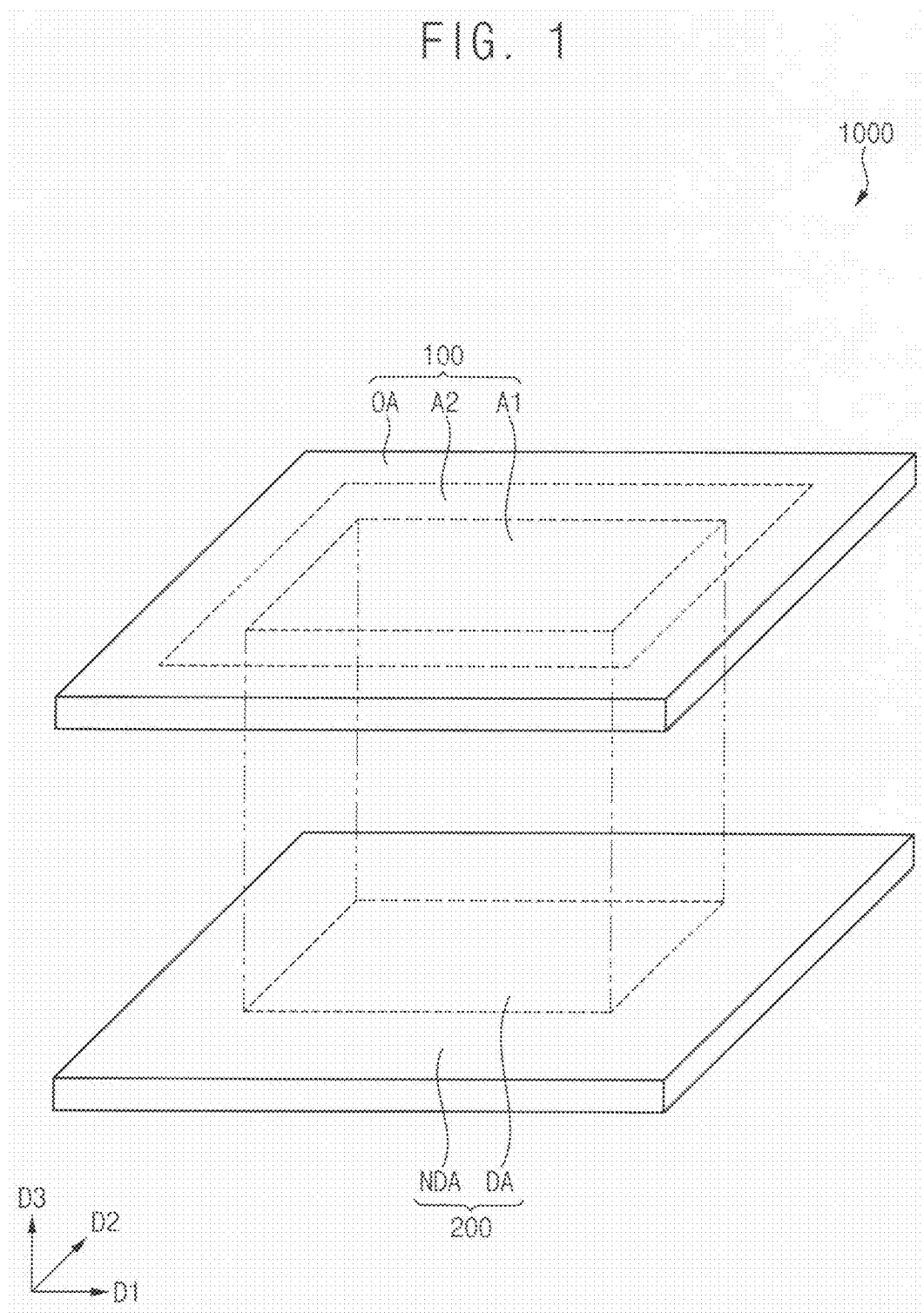
FIG. 1 is an exploded perspective view illustrating an embodiment of a display device.

Hereinafter, a display device in embodiments of the disclosure will be explained in detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
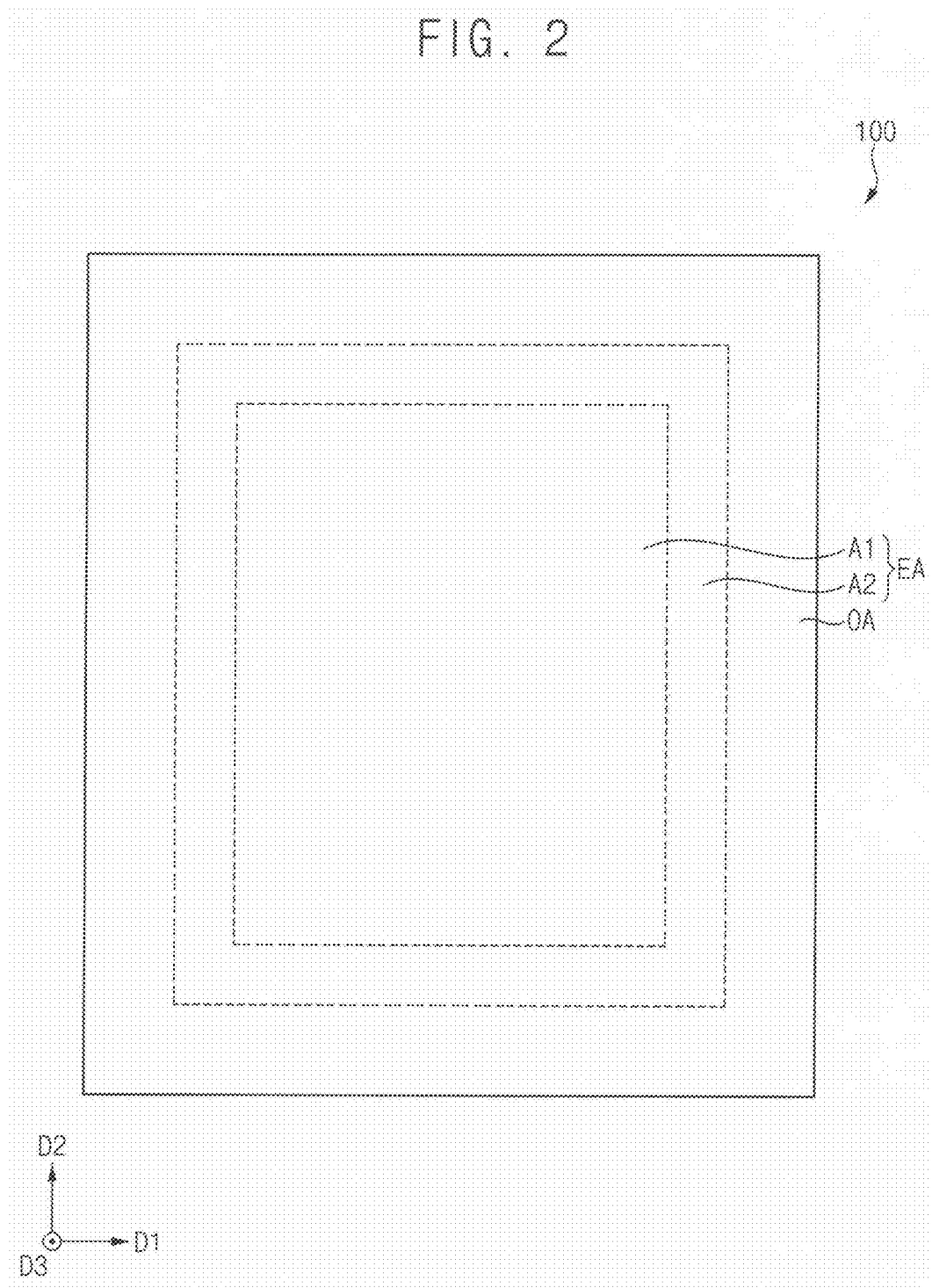
FIG. 2 is a plan view illustrating a cover window included in the display device of FIG. 1.
Figure 3:
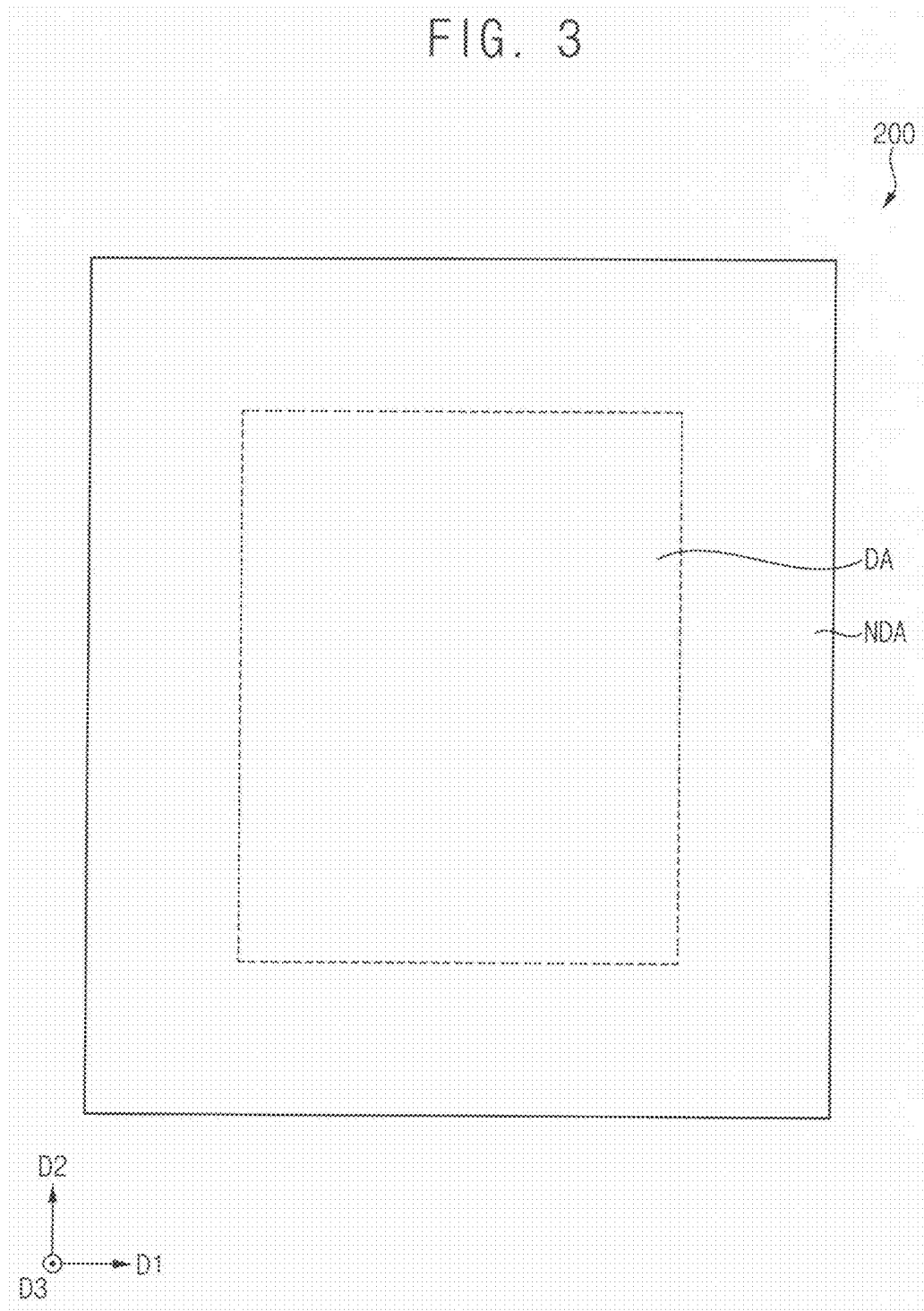
FIG. 3 is a plan view illustrating a display panel included in the display device of FIG. 1.

FIG. 1 is an exploded perspective view illustrating an embodiment of a display device. FIG. 2 is a plan view illustrating a cover window included in the display device of FIG. 1. FIG. 3 is a plan view illustrating a display panel included in the display device of FIG. 1.

Referring to FIGS. 1, 2, and 3, a display device 1000 in an embodiment may include a display panel 200 and a cover window 100. In an embodiment, a plane of the display panel 200 and a plane of the cover window 100 may be defined by a first direction D1 and a second direction D2 crossing the first direction D1, and a third direction (also referred to as a thickness direction) D3 may be perpendicular to the plane of the display panel 200 and the plane of the cover window 100.

The display panel 200 may include a display area DA and a non-display area NDA. In an embodiment, the display area DA may have a quadrangular (e.g., rectangular) shape. The non-display area NDA may be disposed to surround at least a portion of the display area DA. At least one pixel may be disposed in the display area DA, and the pixel may emit light. In other words, light may be emitted from the display area DA.

The cover window 100 may be disposed on the display panel 200. The cover window 100 may include a light-emitting area EA and an outer area OA. The light-emitting area EA may include a first area A1 and a second area A2. In an embodiment, the first area A1 may have a quadrangular (e.g., rectangular) shape, and the second area A2 may be disposed to surround at least a portion of the first area A1. However, the disclosure is not limited thereto, and the first area A1 may have various other shapes. The outer area OA may be disposed to surround at least a portion of the second area A2.

In an embodiment, the first area A1 may correspond to the display area DA. In an embodiment, the first area A1 may overlap the display area DA, and an area of the first area A1 may be substantially the same as an area of the display area DA, for example.

In an embodiment, the second area A2 and the outer area OA may correspond to the non-display area NDA. In an embodiment, the second area A2 and the outer area OA may overlap the non-display area NDA, and a sum of an area of the second area A2 and an area of the outer area OA may be substantially the same as an area of the non-display area NDA, for example.

Figure 4:
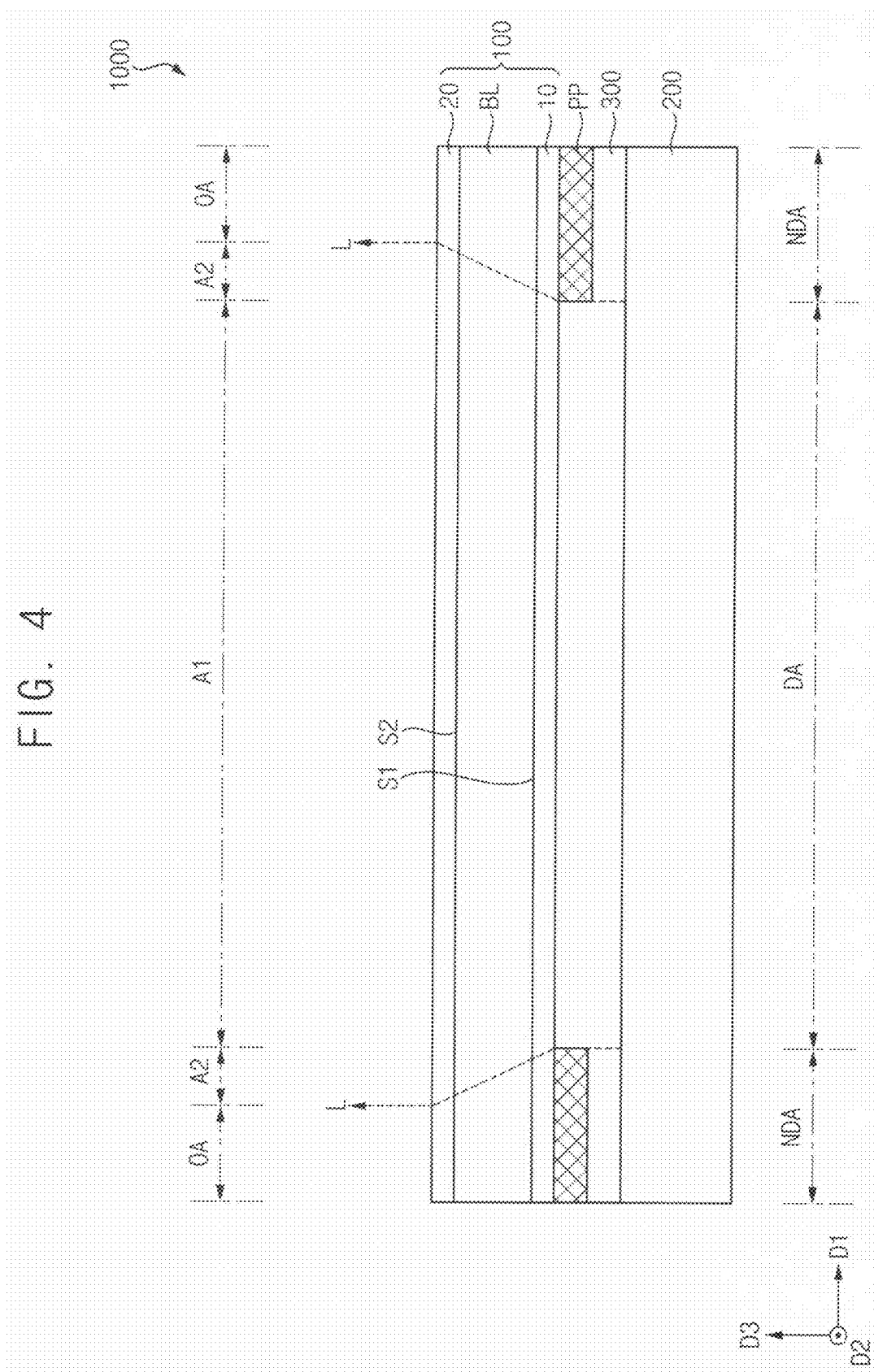
FIG. 4 is a cross-sectional view illustrating the display device of FIG. 1.

FIG. 4 is a cross-sectional view illustrating the display device of FIG. 1.

Referring to FIG. 4, the display device 1000 may include the display panel 200, an adhesive layer 300, a printed pattern PP, and the cover window 100.

The adhesive layer 300 may be disposed on the display panel 200. In an embodiment, the adhesive layer 300 may include a pressure sensitive adhesive, an optically clear adhesive, an optically clear resin, or the like. The adhesive layer 300 may adhere the cover window 100 to the display panel 200.

The print pattern PP may be disposed under the cover window 100, and may overlap the non-display area NDA, the second area A2, and the outer area OA. The printed pattern PP may include a light-blocking material that blocks light. Accordingly, the printed pattern PP may prevent the user from seeing the line disposed in the non-display area NDA.

In an embodiment, a width of the outer area OA may be smaller than a width of the print pattern PP. In an embodiment, the width of the outer area OA and the width of the second area A2 may be substantially the same as the width of the printed pattern PP, for example.

The cover window 100 may include a base layer BL, a first functional layer 10, and a second functional layer 20. The first functional layer 10 may be disposed on a first surface S1 of the base layer BL, and the second functional layer 20 may be disposed on a second surface S2 of the base layer BL. In an embodiment, the first surface S1 may be defined as a surface facing the display panel 200, and the second surface S2 may be defined as a surface opposite to the first surface S1.

The base layer BL may function as a body of the cover window 100. In an embodiment, the base layer BL may include or consist of glass, plastic, or the like.

The first functional layer 10 may be disposed under the base layer BL. In an embodiment, the first functional layer 10 may be formed through an ion exchange process for the base layer BL. Accordingly, the first functional layer 10 may be formed on a surface of the base layer BL. In other words, the thickness of the first functional layer 10 may correspond to an ion penetration depth ("depth of layer") in the ion exchange process. The ion exchange process will be described with reference to FIG. 7.

In an embodiment, the refractive index of the first functional layer 10 may increase from the first area A1 to the outer area OA.

The second functional layer 20 may be disposed on the base layer BL. In an embodiment, the second functional layer 20 may be formed through an ion exchange process for the base layer BL. Accordingly, the second functional layer 20 may be formed on a surface of the base layer BL.

In an embodiment, the refractive index of the second functional layer 20 may increase from the first area A1 to the outer area OA.

As described above, a light L may be emitted from the display area DA. As the refractive index of the first functional layer 10 increases toward the outer area OA and the refractive index of the second functional layer 20 increases toward the outer area OA, The light L adjacent to the non-display area NDA may be refracted in the first functional layer 10 and/or the second functional layer 20. Accordingly, the light L may be emitted to the second area A2, and the bezel of the display device 1000 may be reduced.

In addition, although FIG. 4 illustrates the display device 1000 including the first functional layer 10 and the second functional layer 20, the invention is not limited thereto. In another embodiment, the display device may omit the first functional layer or omit the second functional layer, for example.

Figure 5:
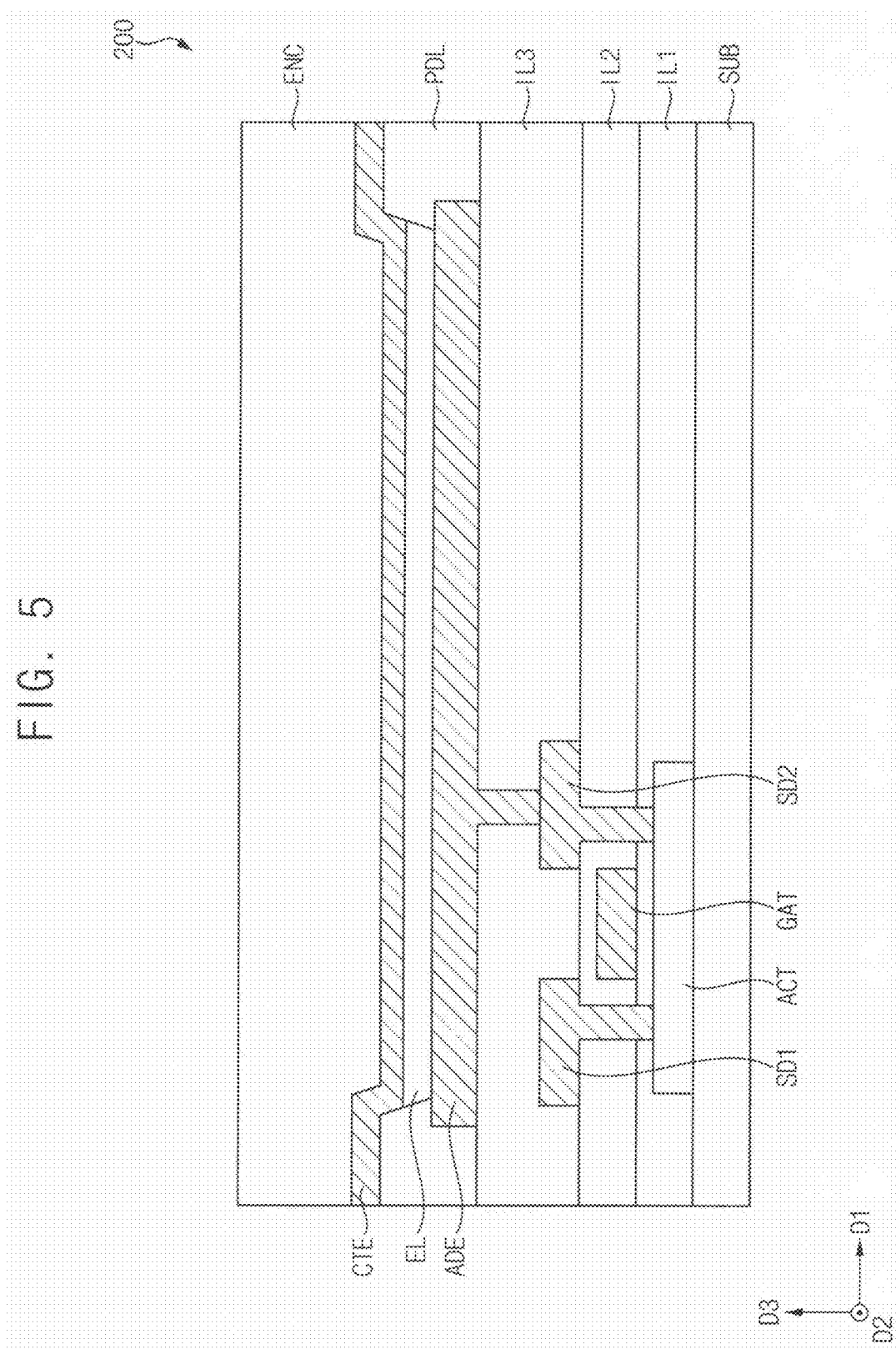
FIG. 5 is a cross-sectional view illustrating a display panel included in the display device of FIG. 4.

FIG. 5 is a cross-sectional view illustrating a display panel included in the display device of FIG. 4.

Referring to FIG. 5, the display panel 200 may include a substrate SUB, an active pattern ACT, a first insulating layer IL1, a gate electrode GAT, a second insulating layer IL2, a first connection electrode SD1, a second connection electrode SD2, a third insulating layer IL3, a first electrode ADE, a pixel defining layer PDL, a light-emitting layer EL, a second electrode CTE, and an encapsulation layer ENC.

The substrate SUB may include a transparent or opaque material. In an embodiment, embodiments of the material that may be used as the substrate SUB may include glass, quartz, plastic, or the like. These may be used alone or in combination with each other.

The active pattern ACT may be disposed on the substrate SUB. In an embodiment, the active pattern ACT may include or consist of a silicon semiconductor material or an oxide semiconductor material. In embodiments, the silicon semiconductor material that may be used as the active pattern ACT may include amorphous silicon, polycrystalline silicon, or the like. In embodiments, the oxide semiconductor material that may be used as the active pattern ACT may include indium-gallium-zinc-oxide ("IGZO") ("InGaZnO") and indium-tin-zinc-oxide ("ITZO") ("InSnZnO"). In addition, the oxide semiconductor material may further include indium ("In"), gallium ("Ga"), tin ("Sn"), zirconium ("Zr"), vanadium ("V"), hafnium ("Hf"), cadmium ("Cd"), germanium ("Ge"), chromium ("Cr"), titanium ("Ti"), and zinc ("Zn"). These may be used alone or in combination with each other.

The first insulating layer IL1 may be disposed on the active pattern ACT. In an embodiment, the first insulating layer IL1 may include or consist of an insulating material. In embodiments, the insulating material that may be used as the first insulating layer IL1 include silicon oxide, silicon nitride, silicon oxynitride, or the like. These may be used alone or in combination with each other. In addition, the first insulating layer IL1 may be formed of a single layer or a multilayer.

The gate electrode GAT may be disposed on the first insulating layer IL1. In an embodiment, the gate electrode GAT may include or consist of a metal, an alloy, a conductive metal oxide, a transparent conductive material, or the like. In embodiments, materials that may be used as the gate electrode GAT may include silver ("Ag"), an alloy including or consisting of silver, molybdenum (Mo), an alloy including or consisting of molybdenum, aluminum ("Al"), an alloy including or consisting of aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like. These may be used alone or in combination with each other. In addition, the gate electrode GAT may be formed of a single layer or a multilayer.

The second insulating layer IL2 may be disposed on the gate electrode GAT. In an embodiment, the second insulating layer IL2 may include or consist of an insulating material. In embodiments, the insulating material that may be used as the second insulating layer IL2 may include silicon oxide, silicon nitride, silicon oxynitride, or the like. These may be used alone or in combination with each other. In addition, the second insulating layer IL2 may be formed of a single layer or a multilayer.

The first connection electrode SD1 and the second connection electrode SD2 may be disposed on the second insulating layer IL2. The first connection electrode SD1 and the second connection electrode SD2 may be formed together and may include the same material as each other. The first connection electrode SD1 and the second connection electrode SD2 may contact the active pattern ACT.

In an embodiment, the first connection electrode SD1 and the second connection electrode SD2 may include or consist of a metal, an alloy, a conductive metal oxide, a transparent conductive material, or the like. In embodiments, materials that may be used as the first connection electrode SD1 and the second connection electrode SD2 may include silver ("Ag"), an alloy including or consisting of silver, molybdenum ("Mo"), an alloy including or consisting of molybdenum, aluminum ("Al"), an alloy including or consisting of aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like. These may be used alone or in combination with each other. In addition, the first connection electrode SD1 and the second connection electrode SD2 may include or consist of a single layer or a multilayer.

The third insulating layer IL3 may be disposed on the first and second connection electrodes SD1 and SD2. In an embodiment, the third insulating layer IL3 may include or consist of an organic insulating material and/or an inorganic insulating material. In embodiments, the organic insulating material that may be used as the third insulating layer IL3 may include photoresist, polyacrylic resin, polyimide resin, acrylic resin, or the like. In embodiments, the inorganic insulating material that may be used as the third insulating layer IL3 may include silicon oxide, silicon nitride, silicon oxynitride, or the like. These may be used alone or in combination with each other. In addition, the third insulating layer IL3 may include or consist of a single layer or a multilayer.

The first electrode ADE may be disposed on the third insulating layer IL3. In an embodiment, the first electrode ADE may include or consist of a metal, an alloy, a conductive metal oxide, a transparent conductive material, or the like. In embodiments, materials that may be used as the first electrode ADE may include silver ("Ag"), an alloy including or consisting of silver, molybdenum (Mo), an alloy including or consisting of molybdenum, aluminum ("Al"), an alloy including or consisting of aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like. These may be used alone or in combination with each other. In addition, the first electrode ADE may include or consist of a single layer or a multilayer.

The pixel defining layer PDL may be disposed on the third insulating layer IL3. An opening exposing the first electrode ADE may be defined in the pixel defining layer PDL.

The light-emitting layer EL may be disposed in the opening on the first electrode ADE. The light-emitting layer EL may emit light in response to a driving current.

The second electrode CTE may be disposed on the light-emitting layer EL.

The encapsulation layer ENC may be disposed on the second electrode CTE. The encapsulation layer ENC may include at least one inorganic layer and at least one organic layer, and may prevent penetration of air and/or moisture.

Figure 6:
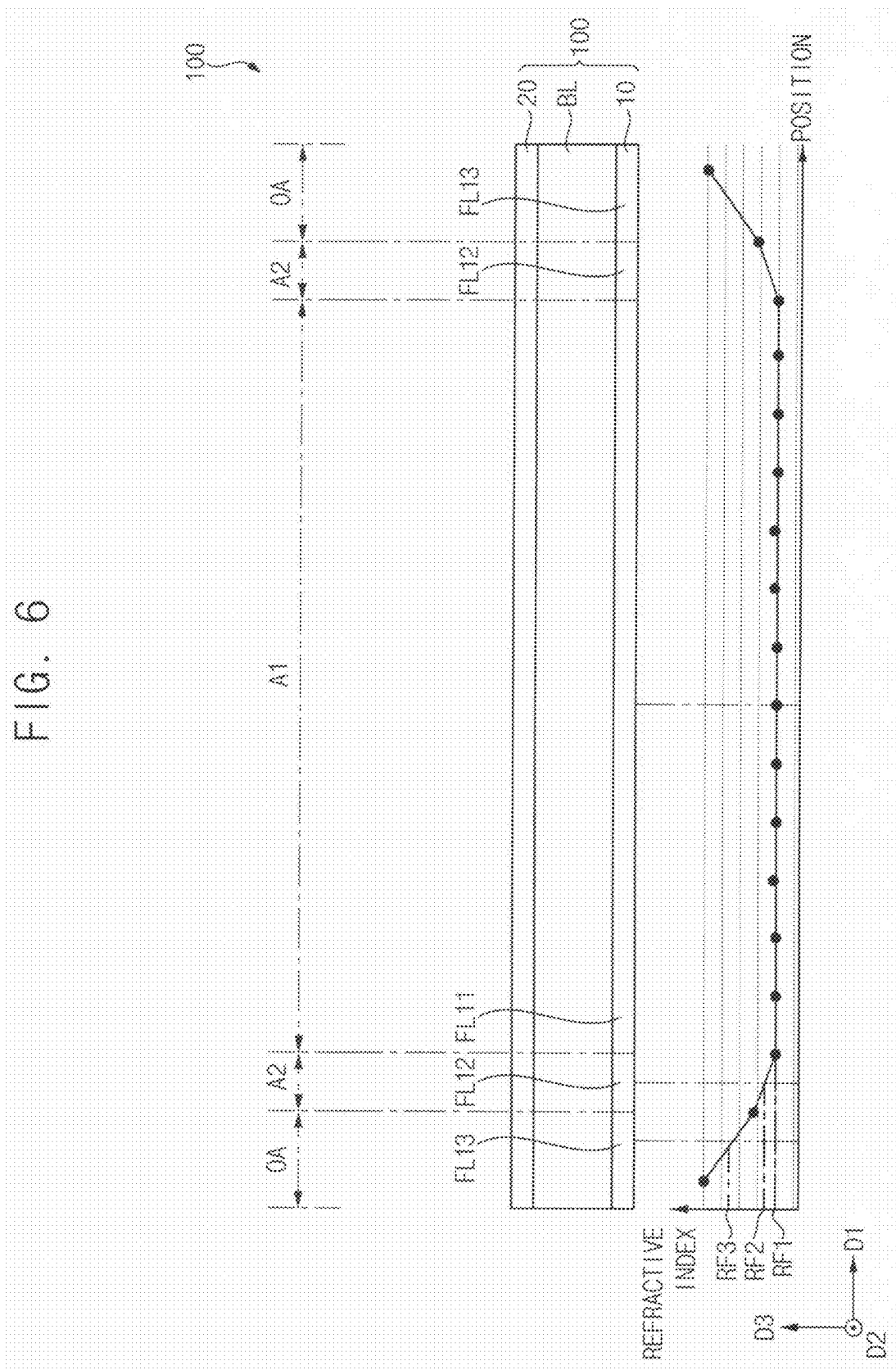
FIG. 6 is a graph for explaining a refractive index of a cover window included in the display device of FIG. 4.
Figure 7:
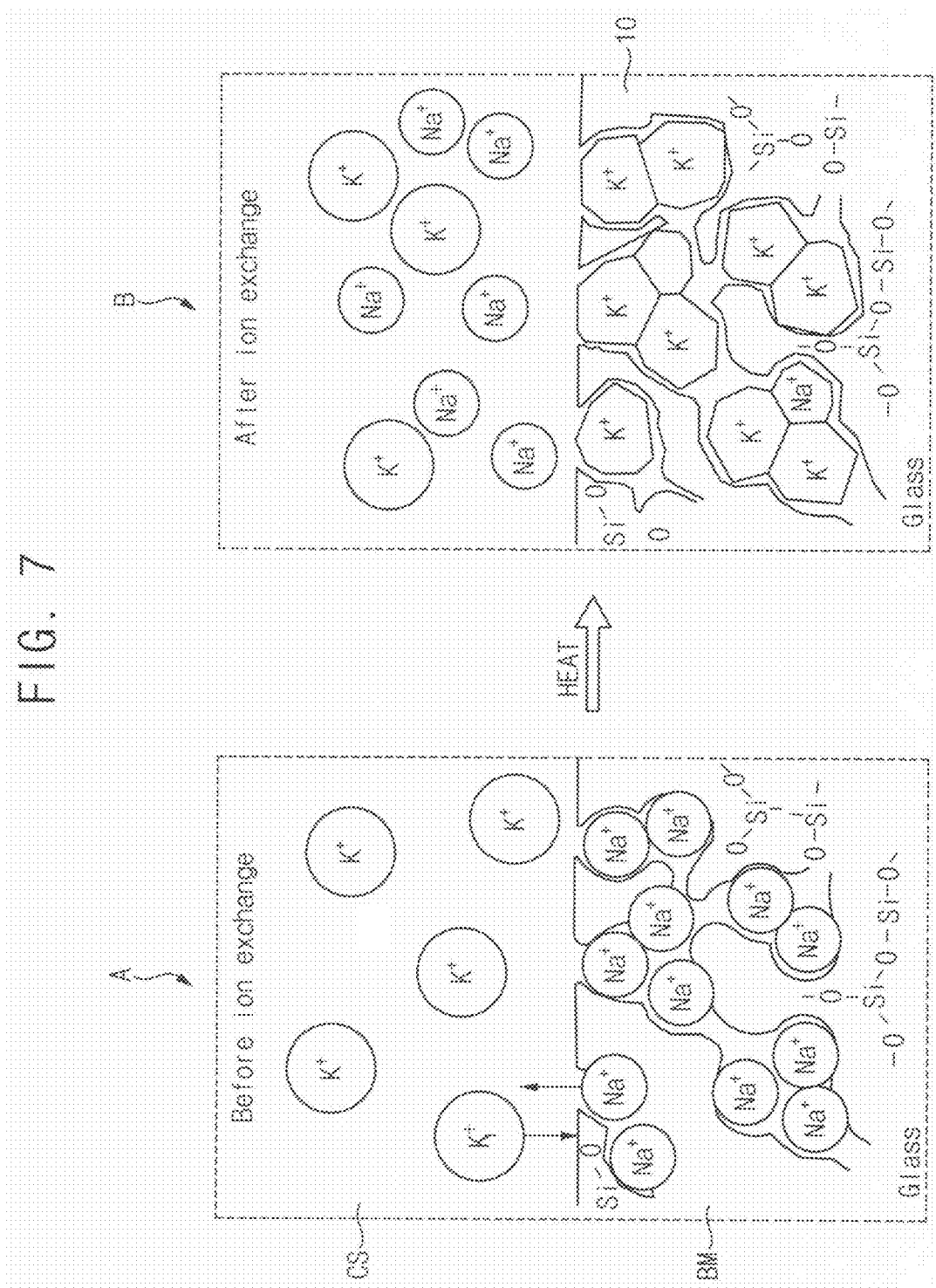
FIG. 7 is a view for explaining a dry ion exchange process.

FIG. 6 is a graph for explaining a refractive index of a cover window included in the display device of FIG. 4. FIG. 7 is a view for explaining a dry ion exchange process.

Referring to FIG. 6, in an embodiment, a first portion FL11, a second portion FL12, and a third portion FL13 may be defined in the first functional layer 10. In an embodiment, the first portion FL11 may refer to the first functional layer 10 overlapping the first area A1, the second portion FL12 may refer to the first functional layer 10 overlapping the second area A2, and the third portion FL13 may refer to the first functional layer 10 overlapping the outer area OA, for example.

In an embodiment, the refractive index of the first functional layer 10 may increase from the first area A1 to the outer area OA. In other words, the first portion FL11 may have a first refractive index RF1, the second portion FL12 may have a second refractive index RF2, and the third portion FL13 may have a third refractive index RF3. In this case, the third refractive index RF3 may be greater than the second refractive index RF2, and the second refractive index RF2 may be greater than the first refractive index RF1.

In an embodiment, in order to implement the refractive index of the first functional layer 10, the first functional layer 10 may be formed through an ion exchange process.

Referring to FIG. 7, the ion exchange process refers to a process of exchanging ions having a small ionic radius existing on the surface of the base member BM (e.g., glass) with ions having a large ionic radius. As the ion radius of the ions on the surface of the base member BM increases, the refractive index of the first functional layer 10 may increase. In addition, as the content of ions on the surface of the base member BM increases, the refractive index of the first functional layer 10 may increase.

In addition, as the ion radius of the ions on the surface of the base member BM increases and the content of the ions increases, the ions may generate a high compressive stress. Accordingly, the strength of the first functional layer 10 may be increased.

The ion exchange process may include a wet ion exchange process and a dry ion exchange process.

The wet ion exchange process supplies ions to the glass by immersing the glass in a salt bath including or consisting of molten salt. Ion exchange is performed as ions penetrate into the glass by diffusion due to concentration differences.

In the dry ion exchange process, a coating solution or paste including or consisting of a molten salt is applied to the surface of the glass. When heat is applied toward the glass to which the coating solution is applied, ion exchange is performed as ions with a small ionic radius diffuse and escape from the glass, and ions with a large ionic radius penetrate into the glass.

In an embodiment, in order to implement the first functional layer 10 whose refractive index increases from the first area A1 to the outer area OA, the cover window 100 may be formed through a dry ion exchange process. In addition, ions exchanged through the dry ion exchange process may be alkali metal ions, for example.

As shown in FIG. 7, (A) may be a diagram for explaining the base member BM and the coating solution CS before the dry ion exchange process is performed, and (B) may be a diagram for explaining the first functional layer 10 after the dry ion exchange process is performed. the coating solution CS including potassium ions ("K+") having a large ionic radius may be applied on the base member BM including sodium ions ("Na+") having a small ionic radius. When heat is applied toward the base member BM to which the coating solution CS is applied, sodium ions ("Na+") diffuse and escape from the base member BM, and potassium ions ("K+") may permeate into the base member BM.

Figure 8:
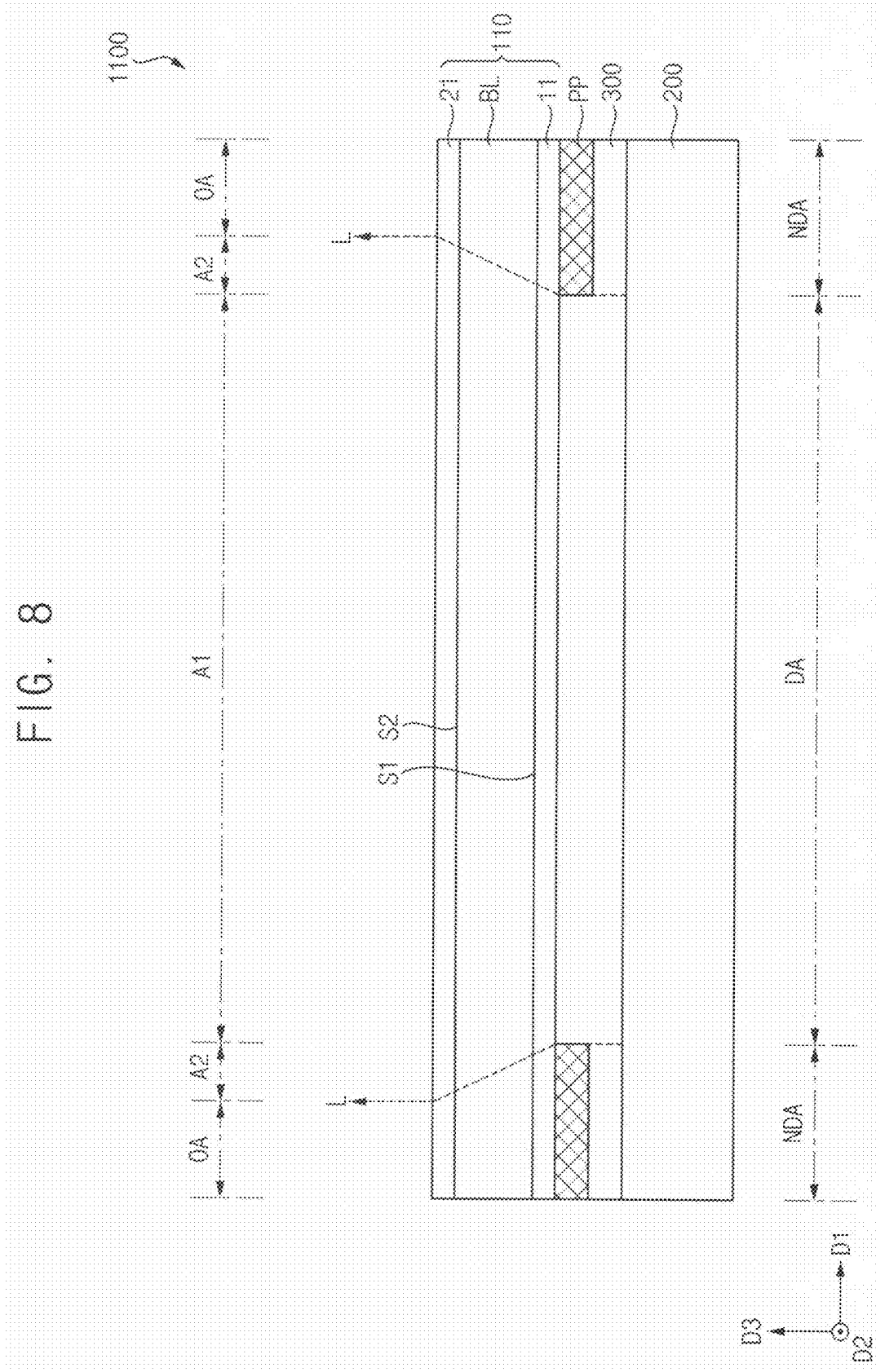
FIG. 8 is a cross-sectional view illustrating an embodiment of a display device.
Figure 9A:
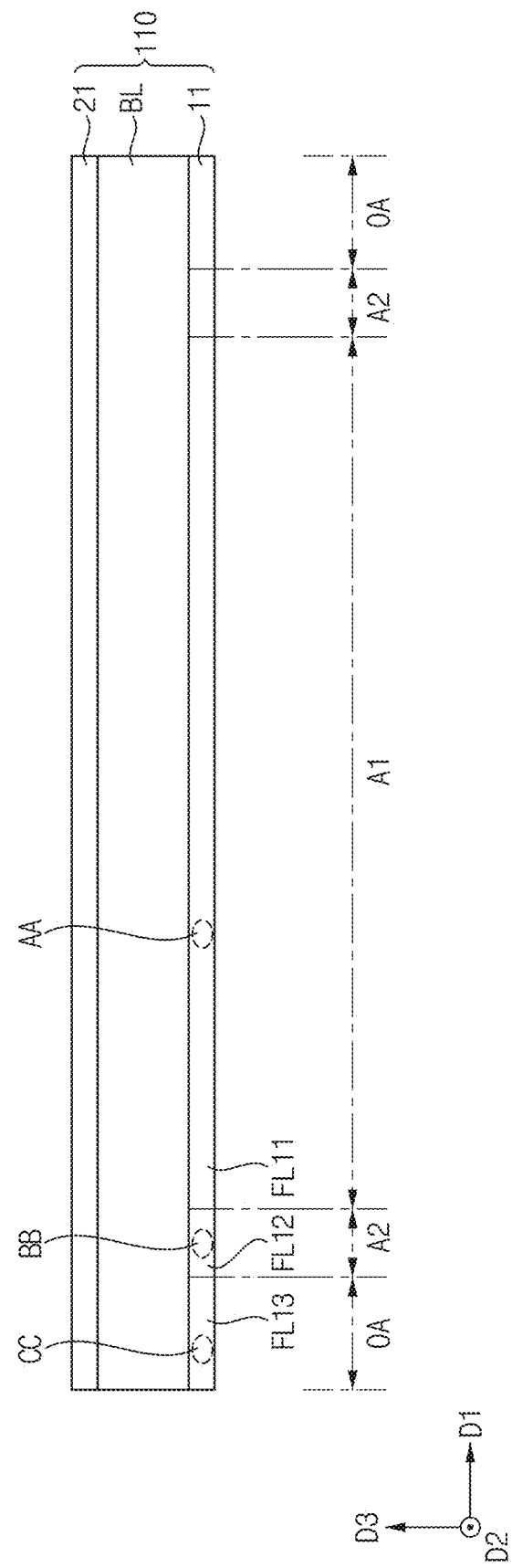
FIG. 9A is a cross-sectional view illustrating a cover window included in the display device of FIG. 8, and FIGS. 9B to 9D are enlarged views of portions AA, BB and CC, respectively, of a first functional layer of the cover window of FIG. 9A.
Figure 9B:
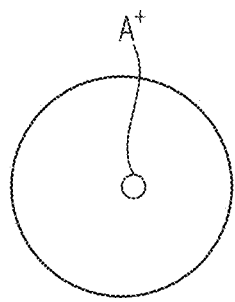
Figure 9C:
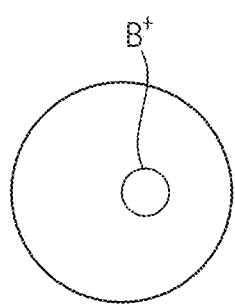
Figure 9D:
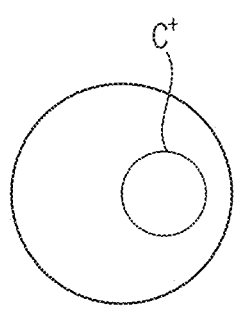

FIG. 8 is a cross-sectional view illustrating an embodiment of a display device. FIG. 9A is a cross-sectional view illustrating a cover window included in the display device of FIG. 8, and FIGS. 9B to 9D are enlarged views of portions AA, BB and CC, respectively, of a first functional layer of the cover window of FIG. 9A.

Referring to FIG. 8, a display device 1100 in an embodiment may include the display panel 200, the adhesive layer 300, the printed pattern PP, and a cover window 110. However, the display device 1100 may be substantially the same as the display device 1000 described with reference to FIG. 4 except for the cover window 110.

Referring to FIG. 9A, the cover window 110 may include the base layer BL, a first functional layer 11, and a second functional layer 21. The first functional layer 11 may be formed on a lower surface of the base layer BL, and the second functional layer 21 may be formed on an upper surface of the base layer BL. In an embodiment, the second functional layer 21 may be implemented to be substantially the same as that of the first functional layer 11.

The first functional layer 11 may include a first portion FL11, a second portion FL12, and a third portion FL13. The first portion FL11 may be defined as the first functional layer 11 overlapping the first area A1 and may include first ions A+. The second portion FL12 may be defined as the first functional layer 11 overlapping the second area A2 and may include second ions B+. The third portion FL13 may be defined as the first functional layer 11 overlapping the outer area OA and may include third ions C+.

In an embodiment, the third ion radius of the third ion C+ may be greater than the first ionic radius of the first ion A+, and may be greater than the second ionic radius of the second ion B+. In addition, the second ion radius may be greater than the first ion radius. Accordingly, the refractive index of the first functional layer 11 may increase from the first area A1 to the outer area OA.

Figure 13A:
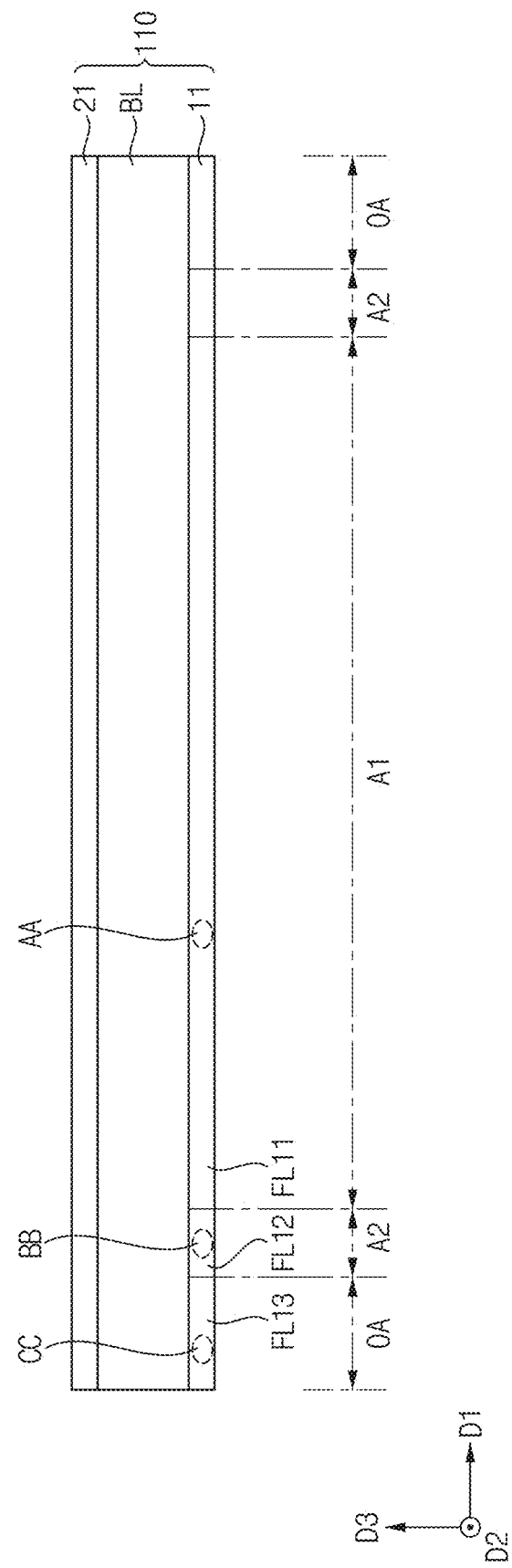
Figure 13B:
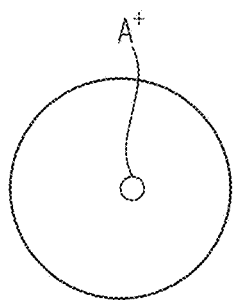
Figure 13C:
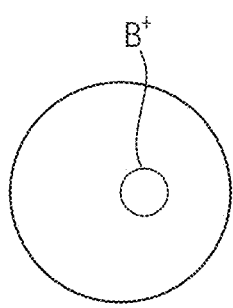
Figure 13D:
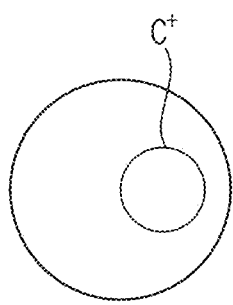

FIGS. 10, 11, 12, and 13A are cross-sectional views illustrating a method of manufacturing the cover window of FIG. 9A, and FIGS. 13B to 13D are enlarged views of portions AA, BB and CC, respectively, of a first functional layer of the cover window of FIG. 13A.

Referring to FIG. 10, the base member BM may be prepared. In an embodiment, the base member BM may be glass including ions having a relatively small ion radius (e.g., lithium ions (Li+)).

Referring to FIG. 11, a first coating solution CST, a second coating solution CS2, and a third coating solution CS3 may be applied to the upper and lower surfaces of the base member BM. The first coating solution CST may be applied to the first area A1 and may include the first ions A+. The second coating solution CS2 may be applied to the second area A2 and may include the second ions B+. The third coating solution CS3 may be applied to the third area A3 and may include the third ions C+.

Referring to FIG. 12, heat may be applied toward the base member BM to which the first, second, and third coating solutions CST, CS2, and CS3 are applied.

Referring to FIGS. 12 and 13A, ions may penetrate into the lower surface of the base member BM to form the first functional layer 11, and ions may penetrate into the upper surface of the base member BM to form the second functional layer 12. The base layer BL may be the base member BM on which ion exchange is not performed.

Figure 15B:
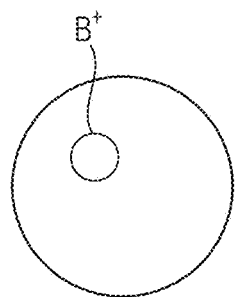
FIG. 15A is a cross-sectional view illustrating a cover window included in the display device of FIG. 14, and FIGS. 15B to 15D are enlarged views of portions AA, BB and CC, respectively, of a first functional layer of the cover window of FIG. 15A.
Figure 15C:
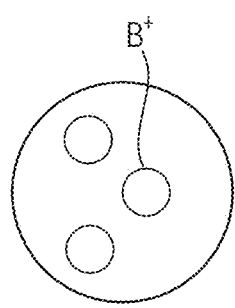
Figure 15D:
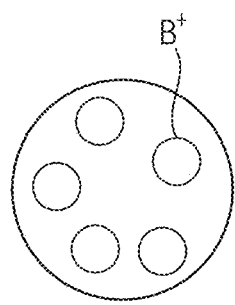

FIG. 14 is a cross-sectional view illustrating an embodiment of a display device. FIG. 15A is a cross-sectional view illustrating a cover window included in the display device of FIG. 14, and FIGS. 15B to 15D are enlarged views of portions AA, BB and CC, respectively, of a first functional layer of the cover window of FIG. 15A.

Referring to FIG. 14, a display device 1200 in another embodiment may include the display panel 200, the adhesive layer 300, the printed pattern PP, and a cover window 120. However, the display device 1200 may be substantially the same as the display device 1000 described with reference to FIG. 4 except for the cover window 120.

Referring to FIG. 15A, the cover window 120 may include the base layer BL, a first functional layer 12, and a second functional layer 22. The first functional layer 12 may be formed on a lower surface of the base layer BL, and the second functional layer 22 may be formed on an upper surface of the base layer BL. In an embodiment, the second functional layer 22 may be implemented substantially the same as the first functional layer 12.

The first functional layer 12 may include a first portion FL11, a second portion FL12, and a third portion FL13. The first portion FL11 may be defined as the first functional layer 12 overlapping the first area A1 and may include second ions B+. The second portion FL12 may be defined as the first functional layer 12 overlapping the second area A2 and may include the second ions B+. The third portion FL13 may be defined as the first functional layer 12 overlapping the outer area OA and may include the second ions B+.

In an embodiment, the first portion FL11 may include the second ion B+ by a first content, the second portion FL12 may include the second ion B+ by a second content, and the third portion FL13 may include the second ion B+ by a third content. The third content may be greater than the second content, and the second content may be greater than the first content. Accordingly, the refractive index of the first functional layer 12 may increase from the first area A1 to the outer area OA.

Figure 17:
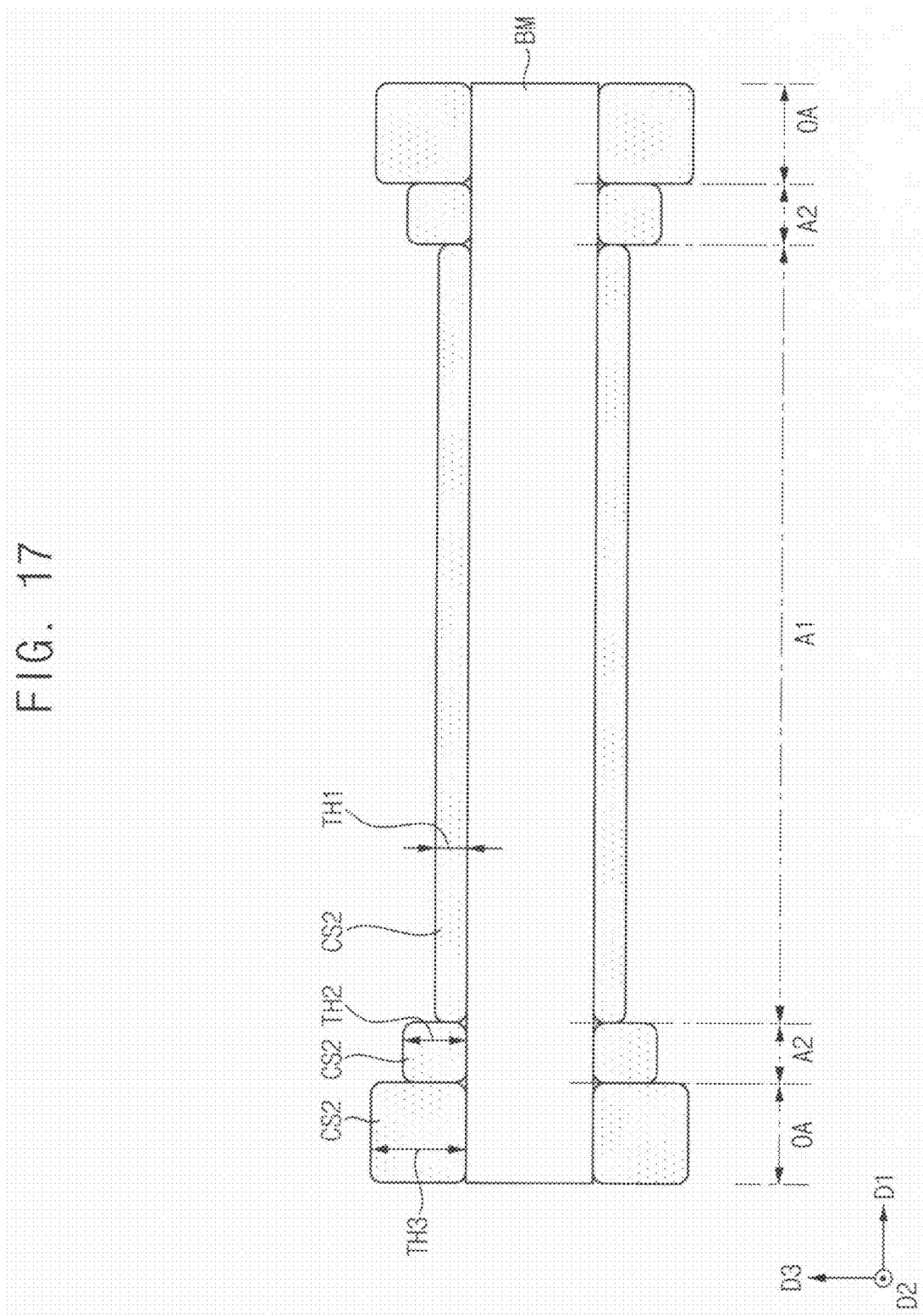
Figure 18:
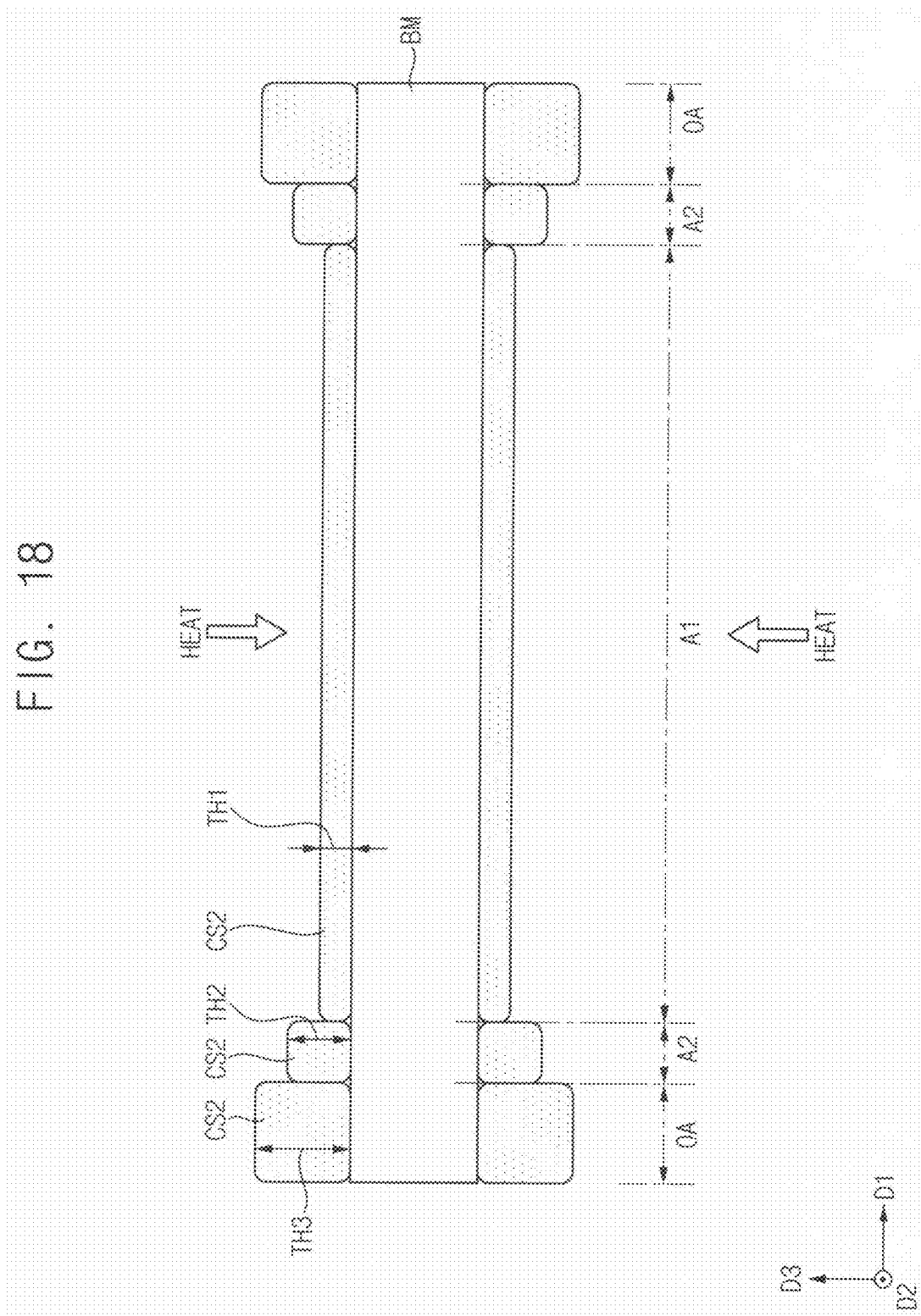
Figure 19A:
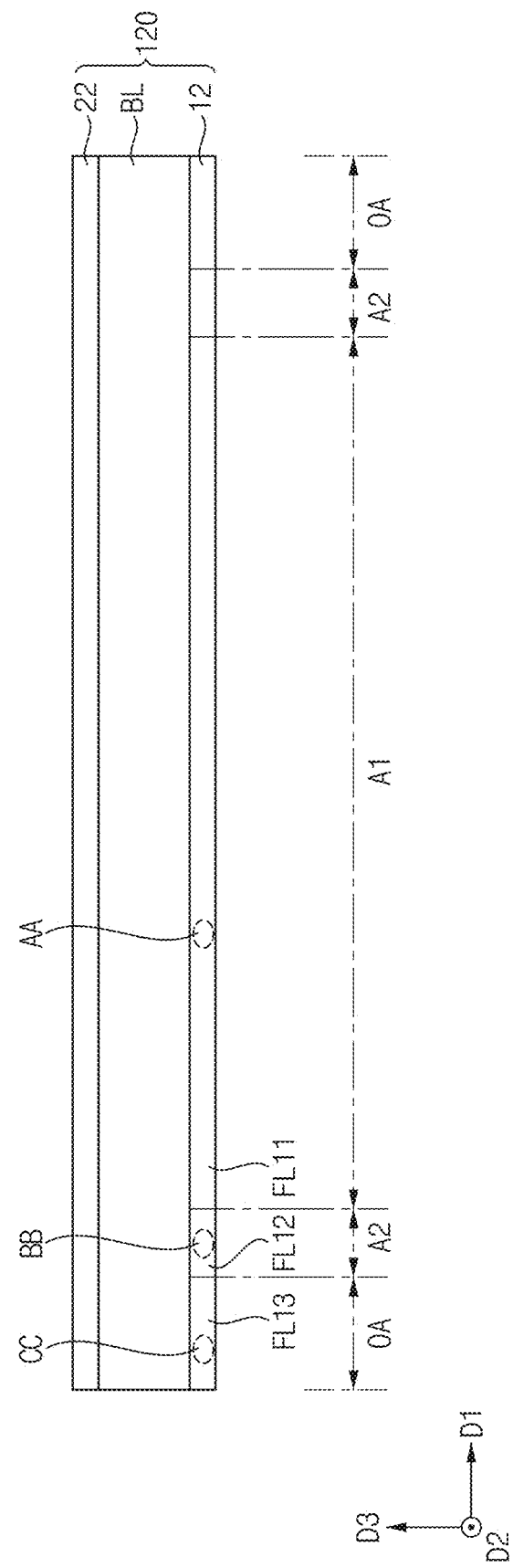
Figure 19B:
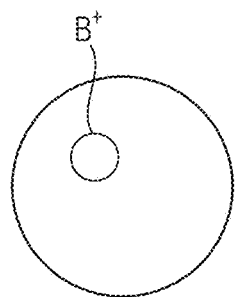
Figure 19C:
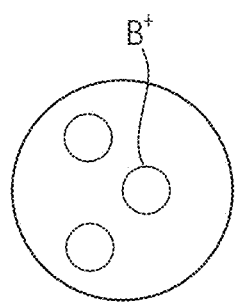
Figure 19D:
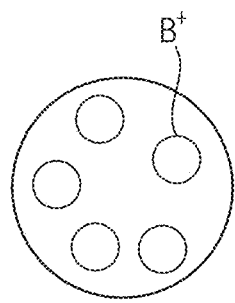

FIGS. 16, 17, 18, and 19A are cross-sectional views illustrating a method of manufacturing the cover window of FIG. 15A, and FIGS. 19B to 19D are enlarged views of portions AA, BB and CC, respectively, of a first functional layer of the cover window of FIG. 19A.

Figure 16:
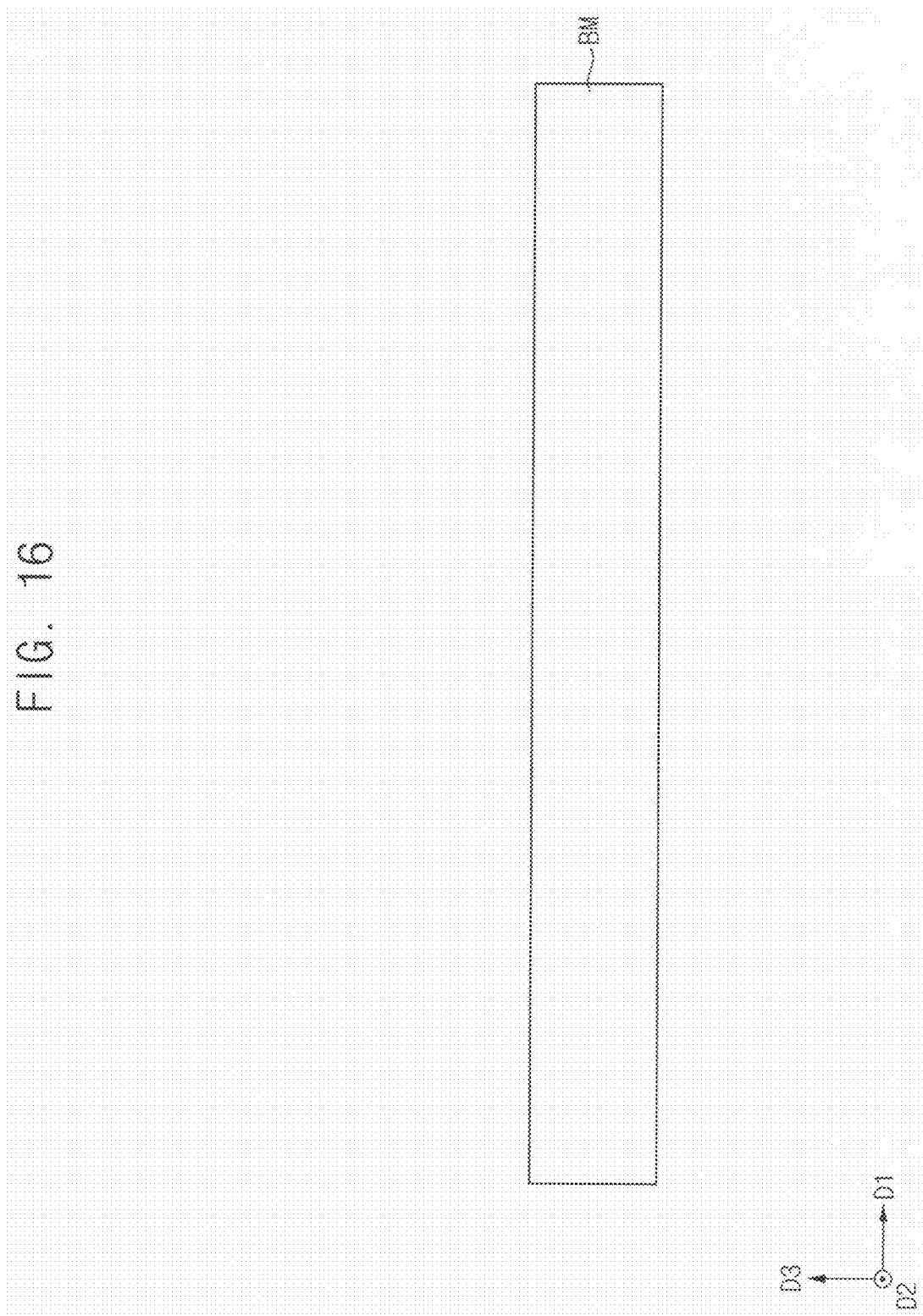
FIGS. 16, 17, 18, and 19A are cross-sectional views illustrating a method of manufacturing the cover window of FIG. 15A, and FIGS. 19B to 19D are enlarged views of portions AA, BB and CC, respectively, of a first functional layer of the cover window of FIG. 19A.

Referring to FIG. 16, the base member BM may be prepared. In an embodiment, the base member BM may be glass including ions having a relatively small ion radius (e.g., lithium ions (Li+)).

Referring to FIG. 17, a second coating solution CS2 may be applied to the upper and lower surfaces of the base member BM. The second coating solution CS2 applied to the first area A1 may have a first thickness TH1, the second coating solution CS2 applied to the second area A2 may have a second thickness TH2, and the second coating solution CS2 applied to the outer area OA may have a third thickness TH3. In an embodiment, the third thickness TH3 may be greater than the second thickness TH2, and the second thickness TH2 may be greater than the first thickness TH1, for example.

Referring to FIG. 18, heat may be applied toward the base member BM to which the second coating solution CS2 is applied.

Referring to FIGS. 18 and 19A, ions may penetrate into the lower surface of the base member BM to form the first functional layer 12, and ions may penetrate into the upper surface of the base member BM to form the second functional layer 22. The base layer BL may be the base member BM on which ion exchange is not performed.

Figure 20:
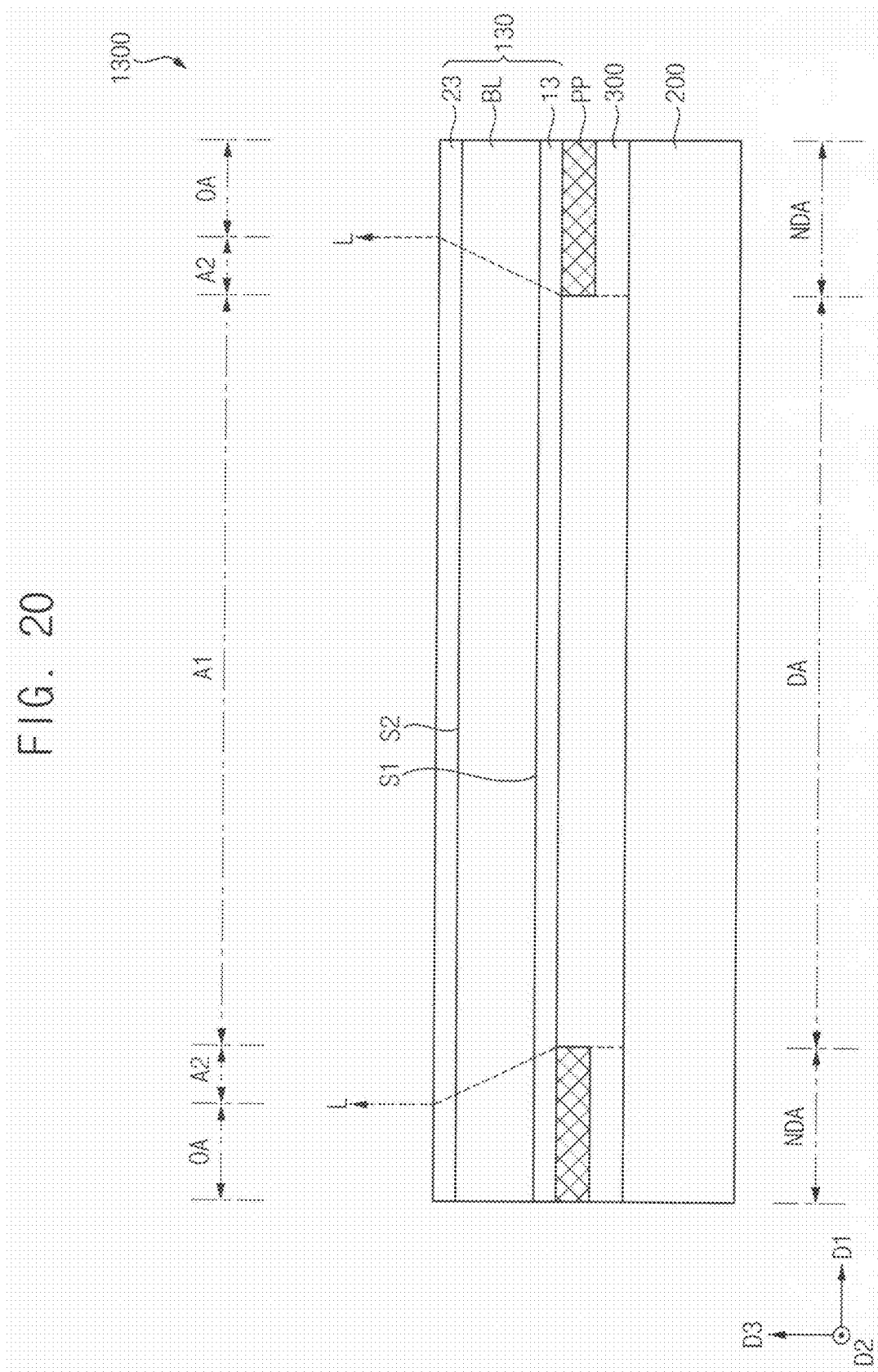
FIG. 20 is a cross-sectional view illustrating an embodiment of a display device.
Figure 21A:
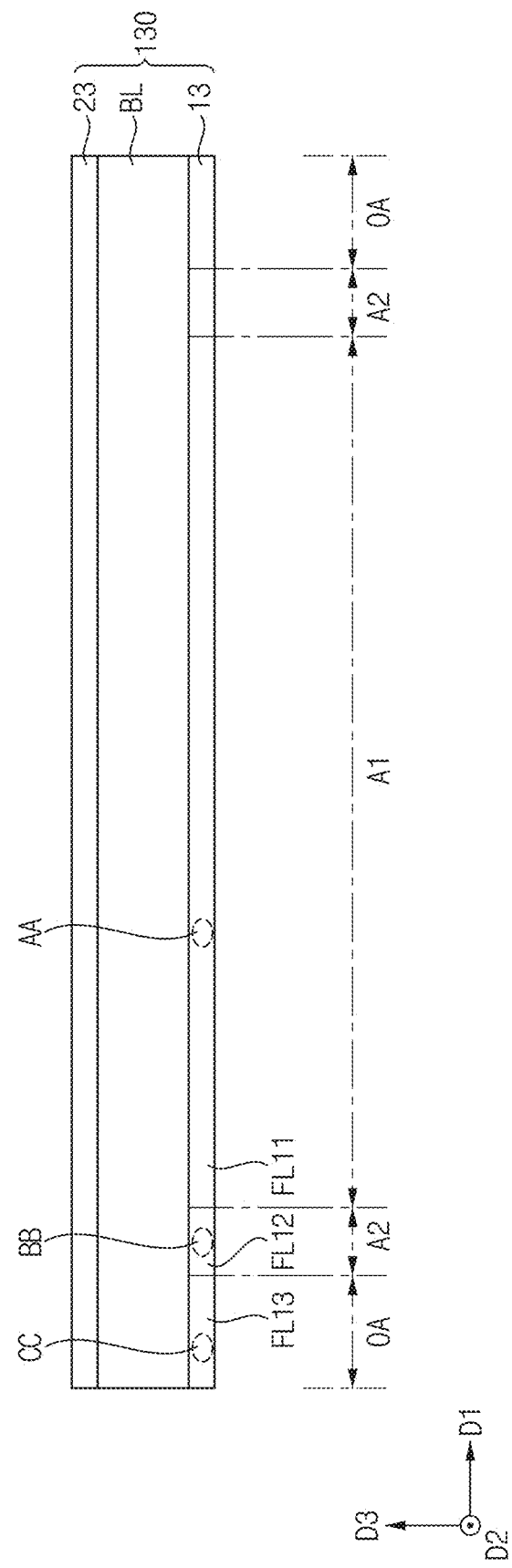
FIG. 21A is a cross-sectional view illustrating a cover window included in the display device of FIG. 20, and FIGS. 21B to 21D are enlarged views of portions AA, BB and CC, respectively, of a first functional layer of the cover window of FIG. 21A.
Figure 21B:
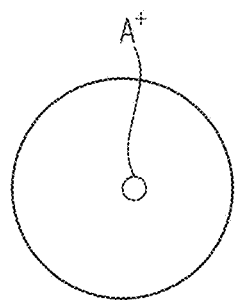
Figure 21C:
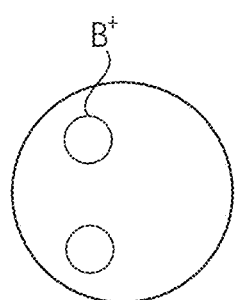
Figure 21D:
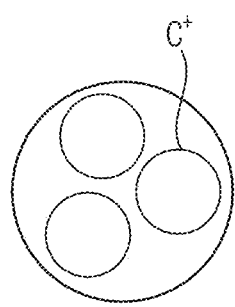

FIG. 20 is a cross-sectional view illustrating an embodiment of a display device. FIG. 21A is a cross-sectional view illustrating a cover window included in the display device of FIG. 20, and FIGS. 21B to 21D are enlarged views of portions AA, BB and CC, respectively, of a first functional layer of the cover window of FIG. 21A.

Referring to FIG. 20, a display device 1300 in another embodiment may include the display panel 200, the adhesive layer 300, the printed pattern PP, and a cover window 130. However, the display device 1300 may be substantially the same as the display device 1000 described with reference to FIG. 4, except for the cover window 130.

Referring to FIG. 21, the cover window 130 may include the base layer BL, a first functional layer 13, and a second functional layer 23. The first functional layer 13 may be formed on a lower surface of the base layer BL, and the second functional layer 23 may be formed on an upper surface of the base layer BL. In an embodiment, the second functional layer 23 may be implemented substantially the same as the first functional layer 13.

The first functional layer 13 may include a first portion FL11, a second portion FL12, and a third portion FL13. The first portion FL11 may be defined as the first functional layer 13 overlapping the first area A1, and may include first ions A+ by a first content. The second portion FL12 may be defined as the first functional layer 13 overlapping the second area A2, and may include second ions B+ by a second content. The third portion FL13 may be defined as the first functional layer 13 overlapping the outer area OA, and may include third ions C+ by a third content.

In an embodiment, the third ion radius of the third ion C+ may be greater than the first ionic radius of the first ion A+, and may be greater than the second ionic radius of the second ion B+. In addition, the second ion radius may be greater than the first ion radius. Accordingly, the refractive index of the first functional layer 13 may increase from the first area A1 to the outer area OA.

In addition, the third content may be greater than the second content, and the second content may be greater than the first content. Accordingly, the refractive index of the first functional layer 13 may increase from the first area A1 to the outer area OA.

Figure 23:
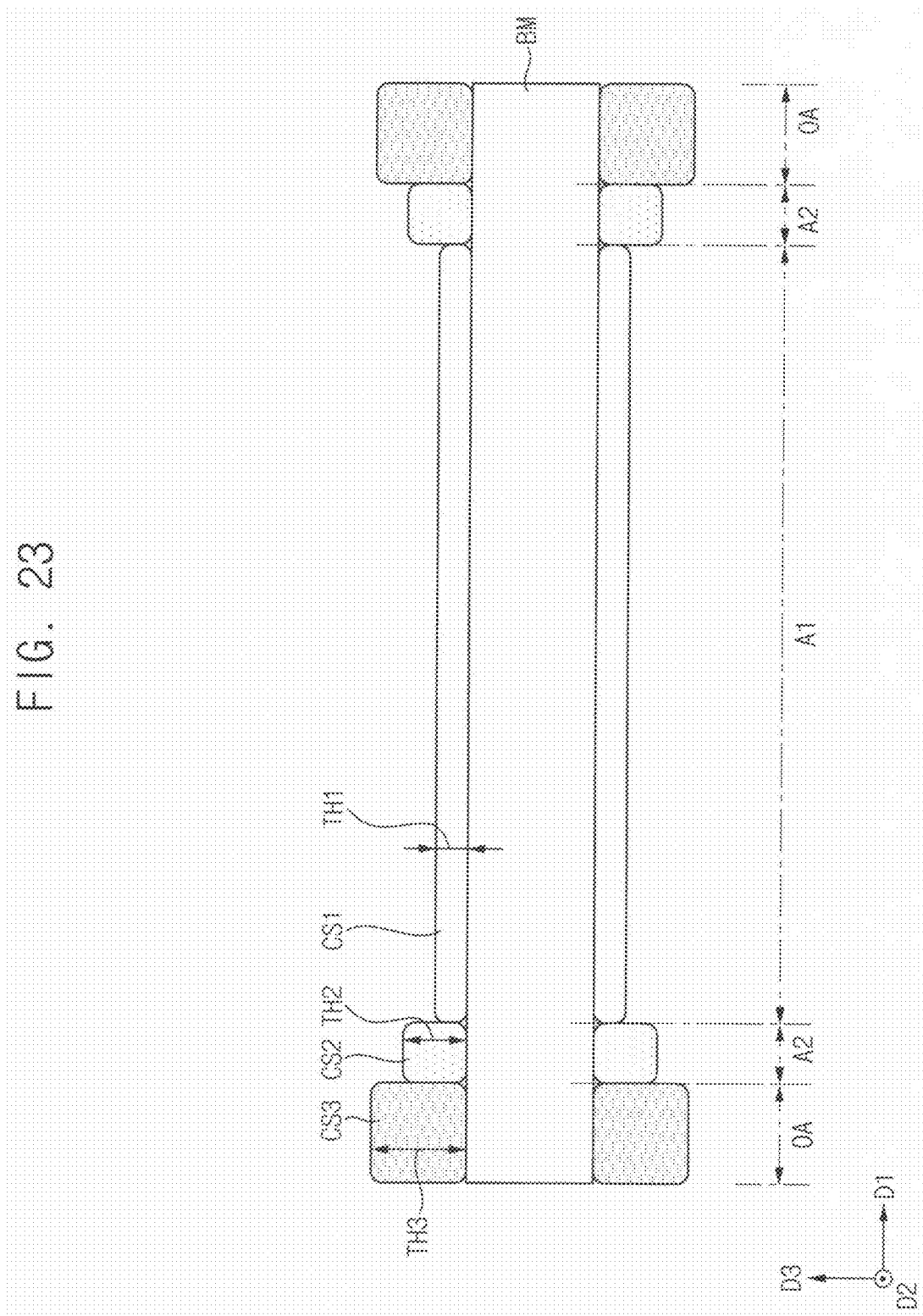
Figure 24:
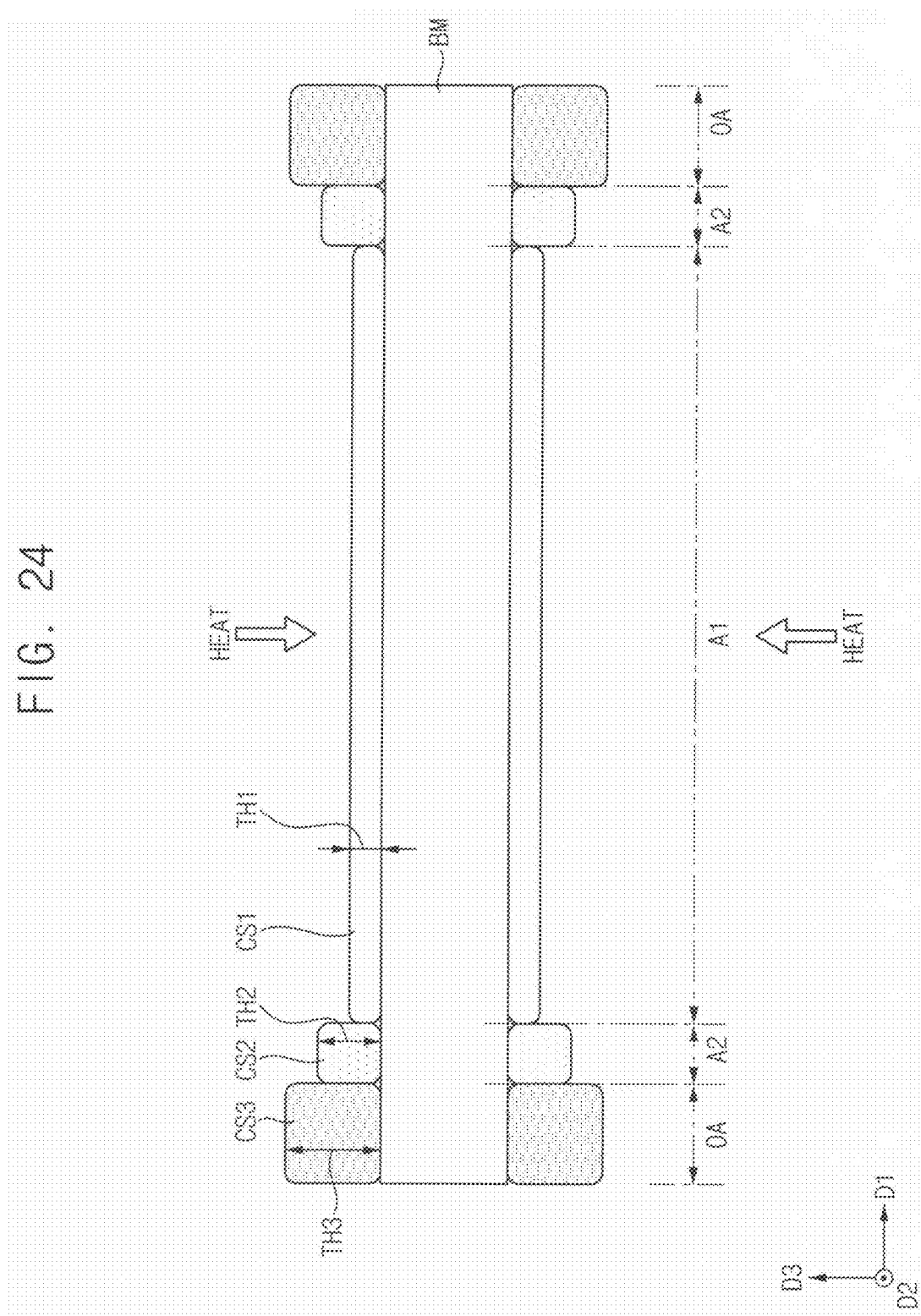
Figure 25A:
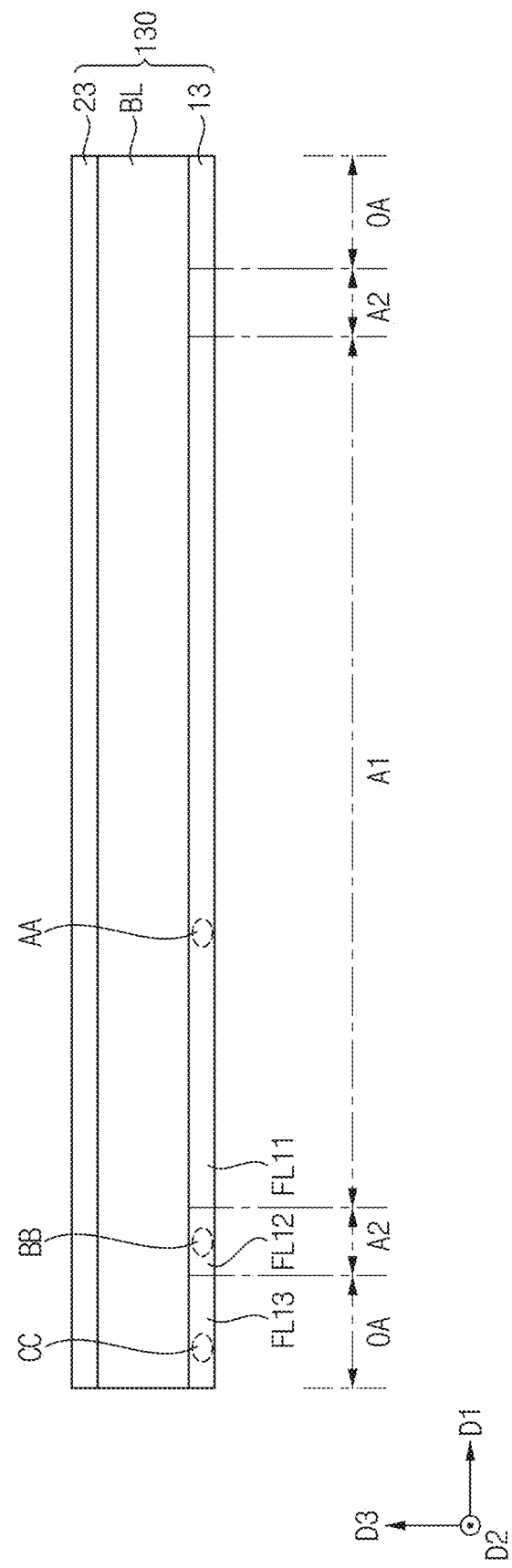
Figure 25B:
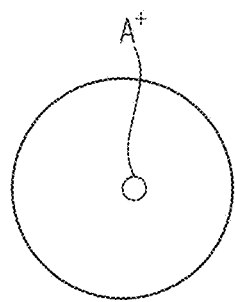
Figure 25C:
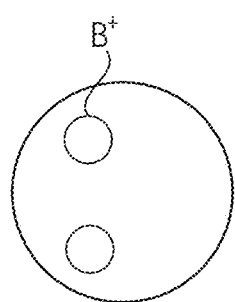
Figure 25D:
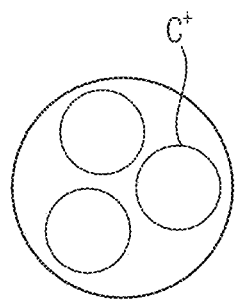

FIGS. 22, 23, 24, and 25A are cross-sectional views for explaining a method of manufacturing the cover window of FIG. 21A, and FIGS. 25B to 25D are enlarged views of portions AA, BB and CC, respectively, of a first functional layer of the cover window of FIG. 25A.

Referring to FIG. 22, the base member BM may be prepared. In an embodiment, the base member BM may be glass including ions having a relatively small ion radius (e.g., lithium ions (Li+)).

Referring to FIG. 23, a first coating solution CS1, a second coating solution CS2, and a third coating solution CS3 may be applied to the upper and lower surfaces of the base member BM. The first coating solution CS1 may be applied to the first area A1 and may include the first ions A+. The second coating solution CS2 may be applied to the second area A2 and may include the second ions B+. The third coating solution CS3 may be applied to the third area A3 and may include the third ions C+.

In addition, the first coating solution CS1 applied to the first area A1 may have a first thickness TH1, the second coating solution CS2 applied to the second area A2 may be have a second thickness TH2, and the third coating solution CS3 applied to the outer area OA may have a third thickness TH3. In an embodiment, the third thickness TH3 may be greater than the second thickness TH2, and the second thickness TH2 may be greater than the first thickness TH1, for example.

Referring to FIG. 24, heat may be applied toward the base member BM to which the first, second, and third coating solutions CS1, CS2, and CS3 are applied.

Referring to FIGS. 24 and 25A, ions may penetrate into the lower surface of the base member BM to form the first functional layer 11, and ions may penetrate into the upper surface of the base member BM to form the second functional layer 12. The base layer BL may be the base member BM on which ion exchange is not performed.

A display device in embodiments may include a display panel and a cover window disposed on the display panel, and a functional layer may be formed on at least one surface of the cover window. The refractive index of the functional layer may increase from a first area (a central area of the display device) toward an outer area. Accordingly, light emitted from the display panel may be refracted by the functional layer. Accordingly, the light may be emitted toward the outer area, and the bezel of the display device may be reduced.

In addition, the functional layer may be formed through an ion exchange process. As the ion radius of the ions included in the functional layer increases and the content of the ions increases, the refractive index of the functional layer may increase, and the strength of the functional layer may increase.

The disclosure may be applied to various display devices. In an embodiment, the disclosure is applicable to various display devices such as display devices for vehicles, ships and aircraft, portable communication devices, display devices for exhibition or information transmission, medical display devices, or the like, for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A cover window comprising:
   a base layer including a light-emitting area and an outer area surrounding at least a portion of the light-emitting area; and
   a functional layer disposed on at least one surface of the base layer and having a refractive index increasing from the light-emitting area to the outer area,
   wherein the light-emitting area includes a first area and a second area surrounding at least a portion of the first area,
   the functional layer overlapping the first area includes a first ion,
   the functional layer overlapping the second area includes a second ion,
   the functional layer overlapping the outer area includes a third ion,
   a third ionic radius of the third ion is greater than a first ionic radius of the first ion and a second ionic radius of the second ion.

2. The cover window of claim 1, wherein
   a third refractive index of the functional layer overlapping the outer area is greater than a first refractive index of the functional layer overlapping the first area, and
   the third refractive index is greater than a second refractive index of the functional layer overlapping the second area.

3. The cover window of claim 2, wherein the second refractive index is greater than the first refractive index.

4. The cover window of claim 1, wherein the second ionic radius is greater than the first ionic radius.

5. The cover window of claim 1, wherein a third content of the third ion is greater than a first content of the first ion, and
   the third content is greater than a second content of the second ion.

6. The cover window of claim 5, wherein the second content is greater than the first content.

7. A cover window comprising:
   a base layer including a light-emitting area and an outer area surrounding at least a portion of the light-emitting area; and
   a functional layer disposed on at least one surface of the base layer and having a refractive index increasing from the light-emitting area to the outer area, wherein the light-emitting area includes a first area and a second area surrounding at least a portion of the first area,
   a third refractive index of the functional layer overlapping the outer area is greater than a first refractive index of the functional layer overlapping the first area,
   the third refractive index is greater than a second refractive index of the functional layer overlapping the second area,
   the functional layer overlapping the first area includes an ion by a first content,
   the functional layer overlapping the second area includes the ion by a second content,
   the functional layer overlapping a third area includes the ion by a third content,
   the third content is greater than the first content, and
   the third content is greater than the second content.

8. The cover window of claim 7, wherein the second content is greater than the first content.

9. The cover window of claim 1, wherein the functional layer includes:
   a first functional layer disposed on a first surface of the base layer; and
   a second functional layer disposed on a second surface opposite to the first surface of the base layer.

10. A display device comprising:
    a display panel;
    a base layer disposed on the display panel and including a light-emitting area and an outer area surrounding at least a portion of the light-emitting area; and
    a functional layer disposed on at least one surface of the base layer and having a refractive index increasing from the light-emitting area to the outer area,
    wherein the light-emitting area includes a first area and a second area surrounding at least a portion of the first area,
    the functional layer overlapping the first area includes a first ion,
    the functional layer overlapping the second area includes a second ion,
    the functional layer overlapping the outer area includes a third ion,
    a third ionic radius of the third ion is greater than a first ionic radius of the first ion, and
    the third ionic radius is greater than a second ionic radius of the second ion.

11. The display device of claim 10, wherein
    the display panel includes a display area corresponding to the first area and a non-display area corresponding to the outer area.

12. The display device of claim 11, wherein a light emitted from the display area is refracted in the functional layer and emitted to the second area.

13. The display device of claim 11, wherein a third refractive index of the functional layer overlapping the outer area is greater than a first refractive index of the functional layer overlapping the first area, and
    the third refractive index is greater than a second refractive index of the functional layer overlapping the second area.

14. The display device of claim 13, wherein the second refractive index is greater than the first refractive index.

15. The display device of claim 10, wherein a third content of the third ion is greater than a first content of the first ion, and
  the third content is greater than a second content of the second ion.

16. The display device of claim 13, wherein the functional layer overlapping the first area includes an ion by a first content,
  the functional layer overlapping the second area includes the ion by a second content,
  the functional layer overlapping a third area includes the ion by a third content,
  the third content is greater than the first content, and
  the third content is greater than the second content.

17. The display device of claim 10, further comprising:
  a print pattern disposed under the base layer,
  wherein a width of the outer area is smaller than a width of the print pattern.

\* \* \* \* \*